(12) United States Patent
Brown et al.

(10) Patent No.: US 11,204,136 B2
(45) Date of Patent: Dec. 21, 2021

(54) LED LIGHT TUBES, LIGHT BOXES INCLUDING LED LIGHT TUBES AND METHODS FOR INSTALLATION OF LED LIGHT TUBES IN LIGHT BOXES

(71) Applicant: Keystone Technologies, LLC, North Wales, PA (US)

(72) Inventors: Joshua David Brown, Philadelphia, PA (US); Evan Michael Smith, Warminster, PA (US)

(73) Assignee: Keystone Technologies, LLC, Lansdale, PA (US)

( * ) Notice: Subject to any disclaimer, the term of this patent is extended or adjusted under 35 U.S.C. 154(b) by 0 days.

(21) Appl. No.: 17/108,659

(22) Filed: Dec. 1, 2020

(65) Prior Publication Data
US 2021/0080065 A1    Mar. 18, 2021

Related U.S. Application Data

(62) Division of application No. 15/968,436, filed on May 1, 2018, now Pat. No. 10,883,669.

(51) Int. Cl.
*F21K 9/275* (2016.01)
*F21K 9/272* (2016.01)
(Continued)

(52) U.S. Cl.
CPC ............. *F21K 9/275* (2016.08); *F21K 9/272* (2016.08); *F21K 9/278* (2016.08); *F21V 3/049* (2013.01);
(Continued)

(58) Field of Classification Search
CPC .......... F21K 9/275; F21K 9/278; F21V 3/049; F21V 5/04; F21V 17/12; F21V 23/002;
(Continued)

(56) References Cited

U.S. PATENT DOCUMENTS

| 2,342,570 A | 2/1944 | Biller |
| 4,631,450 A | 12/1986 | LAgree et al. |

(Continued)

FOREIGN PATENT DOCUMENTS

| CN | 201772284 U | 3/2011 |
| CN | 203848190 U | 9/2014 |

(Continued)

OTHER PUBLICATIONS

International Search Report and Written Opinion for corresponding application No. PCT/US2018/30515, dated Sep. 18, 2018.
(Continued)

*Primary Examiner* — Mary Ellen Bowman
(74) *Attorney, Agent, or Firm* — Flaster Greenberg PC

(57) ABSTRACT

Light emitting diode (LED) light tubes having rotatable end cap assemblies are described. The LED light tubes include a hollow tube and a circuit board with LED chips thereon. The end cap assemblies are provided on either end of the tube. Each end cap assembly includes a socket cap, a plug having a plug body and at least one connector, and an end cap body, one end of which engages one of the ends of the hollow tube. A cam locking mount that is positioned within the plug body and on the opposite side has projections to be positioned in the bore of the end cap body. A rotation cam is seated in the cam locking mount and provides for controlled rotation of the LED tube relative to the end caps. Methods of installing the LED light tubes in new installations and retrofit installations and for use in sign assemblies are also described.

59 Claims, 16 Drawing Sheets

(51) Int. Cl.
*F21K 9/278* (2016.01)
*F21V 3/04* (2018.01)
*F21V 5/04* (2006.01)
*F21V 23/00* (2015.01)
*F21V 17/12* (2006.01)
*G09F 13/22* (2006.01)
*G09F 13/00* (2006.01)
*F21V 23/06* (2006.01)
*F21Y 115/10* (2016.01)
*F21Y 103/10* (2016.01)

(52) U.S. Cl.
CPC ............... *F21V 5/04* (2013.01); *F21V 17/12* (2013.01); *F21V 23/002* (2013.01); *F21V 23/06* (2013.01); *G09F 13/005* (2013.01); *G09F 13/22* (2013.01); *F21Y 2103/10* (2016.08); *F21Y 2115/10* (2016.08); *G09F 2013/222* (2013.01)

(58) Field of Classification Search
CPC ........ F21V 23/06; G09F 13/005; G09F 13/22; G09F 2013/222; F21Y 2103/10; F21Y 2115/10
See application file for complete search history.

(56) References Cited

U.S. PATENT DOCUMENTS

| | | |
|---|---|---|
| 5,183,327 A | 2/1993 | Fabbri |
| 6,868,628 B2 | 3/2005 | Robertson et al. |
| 7,114,830 B2 | 10/2006 | Robertson et al. |
| 7,154,755 B2 | 12/2006 | Araujo |
| 7,307,391 B2 | 12/2007 | Shan |
| 7,488,086 B2 | 2/2009 | Wu et al. |
| 7,562,998 B1 | 7/2009 | Yen |
| 7,637,045 B2 | 12/2009 | Sakai |
| 7,997,770 B1 | 8/2011 | Meurer |
| 8,066,411 B1 | 11/2011 | Barton et al. |
| 8,115,411 B2 | 2/2012 | Shan |
| 8,502,454 B2 | 8/2013 | Sadwick |
| 8,531,134 B2 | 9/2013 | Chemel et al. |
| 8,536,802 B2 | 9/2013 | Chemel et al. |
| 8,668,361 B2 | 3/2014 | Hasnain et al. |
| 8,791,650 B2 | 7/2014 | Shan |
| 8,956,013 B1* | 2/2015 | Shew ............... F21S 4/28 362/249.02 |
| 9,072,133 B2 | 6/2015 | Chemel et al. |
| 9,125,254 B2 | 9/2015 | Chemel et al. |
| 9,285,088 B2 | 3/2016 | Rolfes et al. |
| 9,635,727 B2 | 4/2017 | Scape et al. |
| 9,829,163 B1 | 11/2017 | Stagni |
| 9,851,054 B2 | 12/2017 | Vincent |
| 9,860,961 B2 | 1/2018 | Chemel et al. |
| 10,465,860 B2 | 11/2019 | Powell et al. |
| 10,794,548 B2 | 10/2020 | Powell et al. |
| 2007/0242466 A1* | 10/2007 | Wu ............... F21V 19/008 362/362 |
| 2011/0019413 A1 | 1/2011 | Zimmerman |
| 2011/0317418 A1 | 12/2011 | Burrell |
| 2012/0124874 A1 | 5/2012 | Breihof |
| 2013/0250565 A1 | 9/2013 | Chiang et al. |
| 2015/0098228 A1 | 4/2015 | Simon et al. |
| 2020/0020033 A1 | 6/2020 | Powell et al. |

FOREIGN PATENT DOCUMENTS

| | | |
|---|---|---|
| CN | 205194262 U | 4/2016 |
| CN | 101789207 A | 7/2017 |
| GB | 2447257 | 9/2008 |
| JP | 05616765 | 10/2014 |
| KR | 100913925 B1 | 8/2009 |
| KR | 101162711 B1 | 7/2012 |

OTHER PUBLICATIONS

Advertisement for Max Lite Double Sided T-8 Lamp.
Principle LED 1—LED Cabinet Lighting • Qwik Stik Double-Sided [https://www.p-led.com/products/qwik-stik-double-sided/; Mar. 1, 2018].
Principle LED—Kwik Stick 1 [https://www.p-led.com/products/qwik-stik-double-sided/; Mar. 1, 2018].
Principle LED 2—Specs [https://www.p-led.com/products/qwik-stik-double-sided/; Mar. 1, 2018].
Revolution T-Lite LED Signage Tubes [Jun. 5, 2017].
Max Lite Double Sided T-8 Lamp (#2).
Neptune LED T-8 Tubes.

* cited by examiner

LED LIGHT TUBES, LIGHT BOXES INCLUDING LED LIGHT TUBES AND METHODS FOR INSTALLATION OF LED LIGHT TUBES IN LIGHT BOXES

CROSS REFERENCE TO RELATED APPLICATION

The present application is a division of U.S. application Ser. No. 15/968,436, filed May 1, 2018, and issued as U.S. Pat. No. 10,883,669, on Jan. 5, 2021.

BACKGROUND OF THE INVENTION

Field of the Invention

The invention relates to the field of light tubes that are illuminated by one or more light emitting diode (LED), and particularly to such light tubes that have rotatable end cap assemblies for use in advertising and other outdoor signs, including those in the form of a one- or two-sided light box assembly that may be installed including such LED light tubes to create a new light installation or that may be installed in an existing light box installation to retrofit such installation to include such LED light tubes in place of fluorescent light tubes.

Description of Related Art

Lighting signs are known in the art using fluorescent lighting tubes. The tubes are mounted within a lighting "box" having one side or two sides that are translucent and having a color and/or design thereon, which sides are mounted in a frame. Such signs may be interior or exterior signs, for example, signs used along the road or in a parking lot area outside a business to advertise a store location or products. Within the frame are side mounting having sockets therein designed for receiving fluorescent tubes. The tubes can be run horizontally or vertically. The tubes illuminate the inside of the box for exterior viewing of the designs on the side of the box so they are visible at night. The fluorescent tubes are connected within the sockets and wired through a ballast and is in connection with existing wiring in communication with an electrical supply source. Such sign fixtures are known in the art. Fluorescent light tubes are also used on the interior of buildings for interior lighting.

Over time, there has been a desire to replace interior fluorescent lighting tubes such as in offices and stores, with LED lighting tubes. LED lighting tubes provide excellent illumination and last far longer than standard fluorescent bulbs, while using less energy such that the represent a reduction in energy costs as well. Such tubes can be retrofit into existing indoor lighting mounts within an existing ceiling frame and the light converted. Such innovation in the signage area has been more difficult because of the wiring in an existing light box assembly, the need to change the socket configurations and the size and weight of the signs as well as the difficulties in re-wiring signs that are remote from the electrical source. Thus, attempted installations may require taking down a sign, or complex re-wiring, rebuilding or replacing of the light box of the sign. It is also important to be able to provide illumination in different directions, particularly for two-sided sign light boxes as the sign may be visible from two directions and/or because if all lights are simply aligned, it can give the appearance of "striping" within the light instead of lights that illuminated in varying directions. Thus, there is a need in the art for an LED tube that can be mounted in a new LED ready frame or, more preferably, in an existing fluorescent tube sign box structure that is easy to install, does not require all new wiring and can be easily installed without having to remove the lighting box or dismantling it. It would also be useful in the art to have such lights which can be mounted and shine in more than one direction for unique illumination effects.

One prior art attempt to create an LED light tube that may be retrofit into a fluorescent socket for various uses including in an illuminated sign may be found in U.S. Pat. No. 7,488,086. This patent describes a retro-fit LED tube having a rotatable fitting. The tube is fit into an independent adaptor which may be plugged into a fluorescent tube socket. The adaptor receives a bi-pin connector from the LED tube on one end and on an opposite end includes its own bi-pin connector for plugging into the socket. Rotation of the tube may be used to adjust the overall length of the assembly by compressing an internally rotatable pin socket and the adaptor is used to retro-fit the tube into the existing sockets.

A further retrofit LED tube is disclosed in U.S. Pat. No. 9,851,054. The tubes described in that patent may be used in place of fluorescent tubes in a light box. A four-sided hollow extruded body may be cut to various sizes and is alleged to fit snugly around an electrical connector instead a standard fluorescent tube socket. LEDs are adhered to sides of the body which may be enclosed in a waterproof outer casing sealed on its end.

U.S. Pat. No. 8,066,411 teaches a LED tube that can include rotatable end caps. The rotating end caps include a two prong connector secured to a limiter that rotates within a collet in a measured manner so as to rotate up to 190° until a stop is reached. The tubes may be in rotatable segments. They can be installed in standard fluorescent fixtures by replacing the fluorescent lamp and the lamp's ballast with LED driver electronics. Once, installed, the segments of the lamp may be rotated.

While various designs of LED tubes exist including those which are double- or multi-sided in terms of their ability to shine LED light, there is still a need in the art for such a tube and method of mounting an LED tube that easily mounts into a sign light box, including in an existing sign installation, can be rotated to any desired angle for illumination and does not require difficult, complex or very expensive installation steps.

BRIEF SUMMARY OF THE INVENTION

The invention includes sign assemblies, light emitting diode light tubes and a method for installing such tubes, and a method for retrofitting light emitting diode light tubes in sign assemblies that incorporate fluorescent light tubes.

In one embodiment, the invention includes a sign assembly that includes at least one translucent side plate; a frame structure securing a perimeter of the at least one translucent side plate, the frame having an interior surface and an exterior surface, wherein the interior surface of the frame has at least two opposite sides spaced from each other; at least one electrical socket; wiring for connecting the electrical socket to an electrical source; and at least one light emitting diode light tube.

The at least one light emitting diode light tube in the sign assembly comprises a hollow tube defining a passageway extending longitudinally therethrough, the hollow tube having a first end and a second end and an exterior surface; a circuit board having a plurality of light emitting diode chips mounted thereon, the circuit board mounted on the exterior surface of the hollow tube; and a first and a second rotatable end cap assembly, each of the first and the second rotatable end cap assembly is mounted respectively on the first end and the second end of the hollow tube.

Each of the first and the second rotatable end caps assemblies comprises: a socket cap defining at least one hole extending longitudinally therethrough; a plug having a plug body and at least one connector extending longitudinally from an exterior end of the plug body, wherein the at least one connector is configured to pass through the at least one hole in the socket cap and be received within the at least one electrical socket, the plug body having on an interior end thereof, an interior surface defining an interior space therein; a rotatable end cap having an end cap body with a first end and a second end, the first end of the end cap body configured to engage one of the ends of the hollow tube and the second end of the end cap body having an inner surface defining a recess, at least one longitudinally extending bore extending through the rotatable end cap and through the recess of the second end of the end cap body, the bore defining a longitudinal passageway, and a longitudinally extending collar situated between the inner surface of the rotatable end cap and the longitudinally extending bore, wherein the plug body is configured to be received at least partially within the second end of the rotatable end cap; a cam locking mount having an exterior facing side configured to be positioned within the interior space of the plug body and an interior facing side having longitudinally extending projections configured to be received within the longitudinally extending bore of the rotatable end cap and to form a longitudinally extending opening between the projections in general alignment with the longitudinal passageway through the bore of the rotatable end cap; a rotation cam having a tubular shape defining a passageway extending therethrough, a first end and a second end, the first end positioned in the recess of the second end of the rotatable end cap between the collar and the bore of the rotatable end cap, wherein an inner facing surface of the collar is configured to receive and engage the first end of the rotation cam, the second end of the rotation cam configured to be received within the cam locking mount around the projections thereof, wherein the rotatable end cap is capable of controlled rotation with respect to the plug body and cam locking mount by rotation of the rotation cam within the collar, and wherein the connector of the plug is in electrical communication with the at least one circuit board.

The sign assembly may include two translucent side plates. A design and/or logo may appear on an exterior facing side of one or more of the at least one translucent side plate. The perimeter of the at least one translucent side plate may be shaped as a rectangle or square or other shape as described herein. The frame structure may comprise a metal or metal alloy. The frame structure may also include a raceway at least at a bottom of the frame structure for receiving electrical wiring. Each of the at least one electrical socket may be configured to receive a two prong connector.

The hollow tube may be an aluminum extrusion. In one embodiment herein, first ends of the end cap bodies may define an area configured to receive one of the first or second ends of the hollow tube, wherein each of the first end and the second end of the hollow tube fits securely within the respective area of each of the first ends of the end cap bodies of each of the first and the second rotatable end caps.

The exterior surface of the hollow tube in a further embodiment may comprise a pair of spaced apart flanges that each define at least one inwardly facing channel shaped to receive longitudinally extending opposite side edges of the circuit board. The assembly may further comprise at least one longitudinally extending diffuser shaped to fit over the circuit board and the plurality of light emitting diodes, wherein the pair of spaced apart flanges each further defines an outwardly facing channel shaped to receive the diffuser. Further, two circuit boards may be provided to the assembly, and in such an embodiment, the exterior surface of hollow tube may comprise two pairs of the spaced apart flanges, wherein the inwardly facing channels of each pair of the spaced apart flanges are shaped to receive the longitudinally extending opposite sides of one of the circuit boards. Two longitudinally extending diffusers may also be provided which preferably each are shaped to fit over one of the circuit boards and the plurality of light emitting diodes, wherein each pair of spaced apart flanges each further defines an outwardly facing channel shaped to receive one of the diffusers.

The light emitting diodes may have a lens provided over each of the light diode chips. Such a lens may include one or more mounting legs for spacing the lens above one of the light diode chips.

The socket cap of the assembly may include two holes. Further the plug may have two connectors, which may be prong connectors. The at least one connector is preferably in electrical communication with the socket and also with a conductive material in electrical communication with the circuit board through wiring extending from the conductive material through the rotatable end cap assembly. In addition to light emitting diode chips, the assembly may further comprise at least one light emitting diode component such as a power supply situated within the hollow tube in electrical communication with the plurality of light emitted diodes. The wire preferably extends through the longitudinally extending opening between the projections of the cam locking mount, through the passageway in the rotation cam and through the longitudinally extending passageway of the bore in the rotatable end cap body and through the first end of the end cap body.

In a further embodiment, the longitudinally extending bore of the end cap body may extend beyond a perimeter edge of the second end of the end cap body. The inner facing surface of the collar of the end cap body may also have a plurality of recesses shaped to successively receive an outward extending feature on a side edge of the first end of the rotation cam for controlled rotation. The interior facing side of the cam locking mount preferably also has a surface extending at least partially peripherally around the longitudinally extending projections of the cam locking mount and at least one stop feature on the surface for engaging a recess proximate an edge of the inner surface of the second end of the end cap body of the rotatable end cap so as to limit rotation of the rotatable end cap.

The plug body may be secured to the cam locking mount by at least one fastener, which may be at least one screw, and at least one of the plug body and the cam locking mount may also include a screw receiving bore while the other has a through opening aligned with the bore. The rotatable end cap may also include at least one screw receiving, bore and the hollow tube include at least one inwardly fastener receiving extension for securing the rotatable end cap to the hollow tube by way of at least one fastener, wherein the at least one fastener may be a screw.

The invention further includes a light emitting diode light tube which is preferably the light emitting diode light tube in the sign assembly as described above.

The invention also includes a method for retrofitting at least one light emitting diode light tube in a sign assembly comprising at least one fluorescent light tube, comprising:

(a) providing a sign assembly having at least one fluorescent light tube having a connector on each end, at least one translucent plate, a frame structure securing a perimeter of the at least one translucent side plate, the frame structure having an interior surface having at least two opposite sides spaced from each other, at least two electrical sockets, each for receiving one of the connectors on the ends of the at least one fluorescent light tube, and wiring for connecting the electrical sockets through a ballast and to an electrical source; (b) opening the sign assembly so as to access the at least one fluorescent light tube and to the ballast; (c) disconnecting wiring extending between the electrical sockets on either side of the fluorescent tubes and the ballast to create disconnected ends on wires extending from the electrical sockets; (d) connecting the disconnected ends to create an electrical bypass around the ballast; (e) removing the at least one fluorescent tube; and (f) installing at least one light emitting diode light tube having a connector on each end thereof in the electrical sockets to form a retrofit sign assembly.

Each end of the at least one light emitting diode light tube preferably has a rotatable end cap assembly on each end thereof comprising the connectors, and the method further comprises rotating the rotatable end cap assemblies of the at least one light emitting diode light tube before or after step (f) so that the light emitting diode light tube will direct light in a desired direction within the retrofit sign assembly.

In one embodiment, in step (a), the sign assembly comprises two or more fluorescent light tubes and in step (f) two or more light emitting diode light tubes are installed to replace the two or more fluorescent light tubes removed in step (e), and before or after step (f) the rotatable end cap assemblies of the each of the two or more light emitting diode light tubes are rotated to direct light in a desired direction within the retrofit sign assembly. The two or more light emitting diode light tubes may be rotated in different directions.

The rotatable end cap assemblies of the invention herein and preferably each comprise: a socket cap defining at least one hole extending longitudinally therethrough; a plug having a plug body, wherein the connector extends longitudinally from an exterior end of the plug body, and the connector is configured to pass through the at least one hole in the socket cap, the plug body having on an interior end thereof, an interior surface defining an interior space therein; a rotatable end cap having an end cap body with a first end and a second end, the first end of the end cap body configured to engage one of the ends of a tube portion of the light emitting diode light tube and the second end of the end cap body having an inner surface defining a recess, at least one longitudinally extending bore extending through the rotatable end cap and through the recess of the second end of the end cap body, the bore defining a longitudinal passageway, and a longitudinally extending collar situated between the inner surface of the rotatable end cap and the longitudinally extending bore, wherein the plug body is configured to be received at least partially within the second end of the rotatable end cap; a cam locking mount having an exterior facing side configured to be positioned within the interior space of the plug body and an interior facing side having longitudinally extending projections configured to be received within the longitudinally extending bore of the rotatable end cap and to form a longitudinally extending opening between the projections in general alignment with the longitudinal passageway through the bore of the rotatable end cap; a rotation cam having a tubular shape defining a passageway extending therethrough, a first end and a second end, the first end positioned in the recess of the second end of the rotatable end cap between the collar and the bore of the rotatable end cap, wherein an inner facing surface of the collar is configured to receive and engage the first end of the rotation cam, the second end of the rotation cam configured to be received within the cam locking mount around the projections thereof, and wherein the rotatable end cap is capable of controlled rotation with respect to the plug body and cam locking mount by rotation of the rotation cam within the collar.

In one embodiment of the method above, the method preferably includes shutting the power prior to step (b) and turning the power on after step (f).

The sign assembly used in the method preferably has two translucent plates and the method further comprises removing at least one of the plates to access the fluorescent light tubes. In one embodiment of the method, the wires in the light assembly in step (a) are positioned in a raceway in a lower portion of the frame below a cover, and the method further comprises removing the cover to access the wires prior to step (c).

The invention also includes a method for installing at least one light emitting diode light tube having rotatable end cap assemblies on either end thereof in an LED-ready sign assembly, comprising: (a) providing a sign assembly having at least one translucent plate, a frame structure securing a perimeter of the at least one translucent side plate, the frame structure having an interior surface having at least two opposite sides spaced from each other, at least two electrical sockets, each for receiving connectors on the ends of at least one light emitting diode light tube, and wiring for connecting the electrical sockets to an electrical source; (b) providing at least one light emitting diode light tube having a first end and a second end and having a rotatable end cap assembly positioned on each of the first and the second end of the at least one light emitting diode light tube, wherein the rotatable end cap assembly has a connector extending from one end thereof; (c) opening the sign assembly so as to access the electrical sockets; (d) rotating the rotatable end cap assemblies on the first and the second ends of one of the at least one light emitting diode light tube; and (e) installing the at least one light emitting diode light tube such that each of the connectors on each of the ends of the rotatable end cap assemblies of the light emitting diode light tube are positioned in electrical communication with the electrical sockets to form a light emitting diode light tube sign assembly.

In this method, in one embodiment, the method further comprises rotating each of the rotatable end cap assemblies after step (e) so that the light emitting diode light tube will direct light in a desired direction within the light emitting diode light tube sign assembly. In step (b), two or more light emitting diode light tubes may be provided, in step (e) two or more light emitting diode light tubes may be installed, and before or after step (e) the rotatable end cap assemblies of the each of the two or more light emitting diode light tubes may be rotated to direct light in a desired direction within the light emitting diode light tube sign assembly. Further, the two or more light emitting diode light tubes may be rotated in different directions.

In the method, each of the rotatable end cap assemblies may comprise: a socket cap defining at least one hole extending longitudinally therethrough; a plug having a plug body, wherein the connector extends longitudinally from an exterior end of the plug body, and the connector is configured to pass through the at least one hole in the socket cap, the plug body having on an interior end thereof, an interior surface defining an interior space therein; a rotatable end cap having an end cap body with a first end and a second end, the first end of the end cap body configured to engage one of the ends of a tube portion of the light emitting diode light tube and the second end of the end cap body having an inner surface defining a recess, at least one longitudinally extending bore extending through the rotatable end cap and through the recess of the second end of the end cap body, the bore defining a longitudinal passageway, and a longitudinally extending collar situated between the inner surface of the rotatable end cap and the longitudinally extending bore, wherein the plug body is configured to be received at least partially within the second end of the rotatable end cap; a cam locking mount having an exterior facing side configured to be positioned within the interior space of the plug body and an interior facing side having longitudinally extending projections configured to be received within the longitudinally extending bore of the rotatable end cap and to form a longitudinally extending opening between the projections in general alignment with the longitudinal passageway through the bore of the rotatable end cap; a rotation cam having a tubular shape defining a passageway extending therethrough, a first end and a second end, the first end positioned in the recess of the second end of the rotatable end cap between the collar and the bore of the rotatable end cap, wherein an inner facing surface of the collar is configured to receive and engage the first end of the rotation cam, the second end of the rotation cam configured to be received within the cam locking mount around the projections thereof, and wherein the rotatable end cap is capable of controlled rotation with respect to the plug body and cam locking mount by rotation of the rotation cam within the collar.

The method for installation preferably further comprises shutting the power prior to step (c) and turning the power on after step (e).

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION

Figure 1:
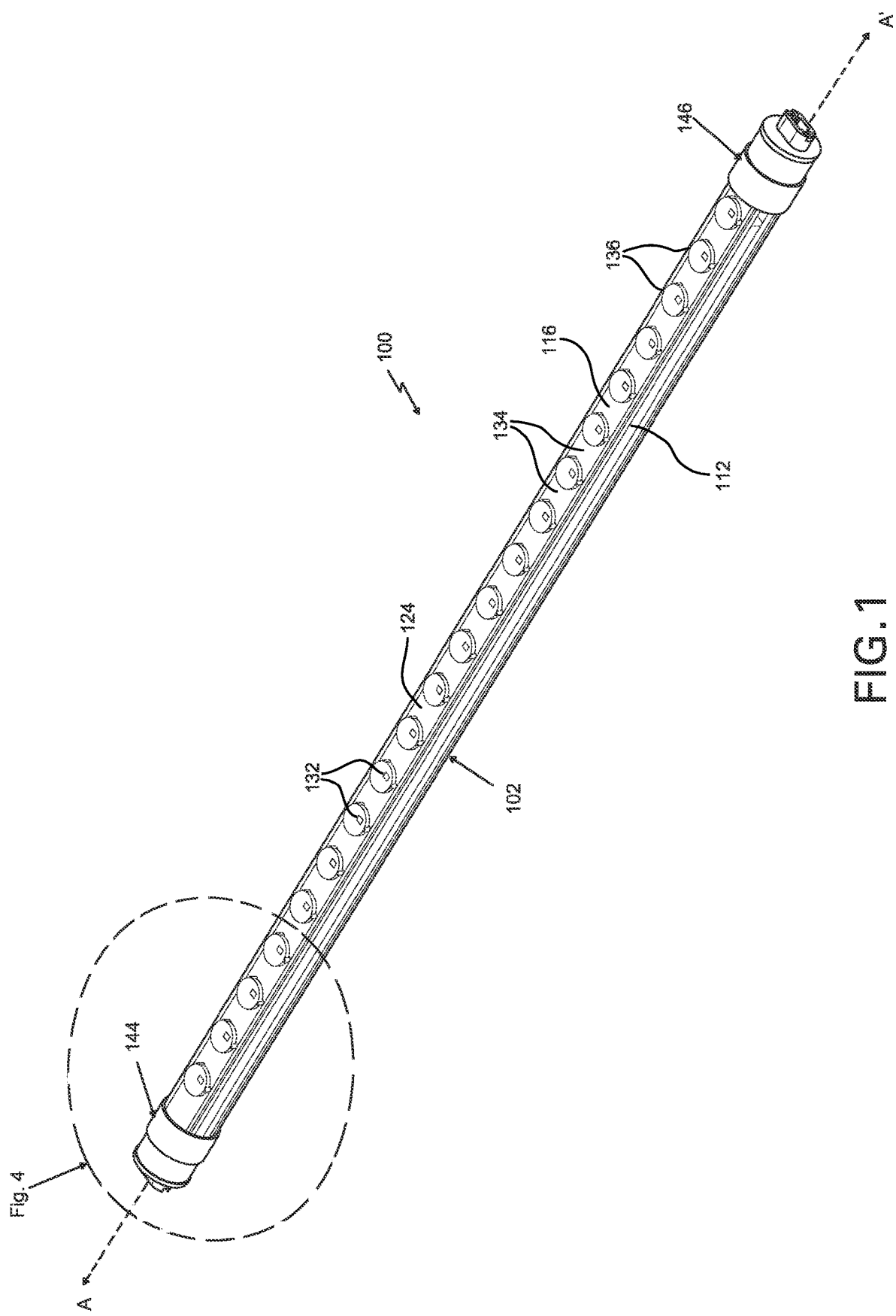
FIG. 1 is a perspective view of a rotatable LED light tube according to an embodiment of the invention.

The following detailed description is intended to provide further details to the invention described in the claims and shown in the Drawings. Light emitting diode (LED) light tubes, and methods for installing the same in sign assemblies which are LED-ready, i.e., already configured for use with LED light tubes, and methods for retrofitting LED light tubes in existing sign assemblies designed initially for use with fluorescent light tubes are described further herein according to preferred embodiments of the invention.

As used herein, words such as "inner" and "outer," "interior" and "exterior," "upper" and "lower," "outside" and "inside," "top" and "bottom," "left" and "right," "inwardly" and "outwardly" and words of similar import are intended to assist in understanding preferred embodiments of the invention with reference to the accompanying drawing Figures and with respect to the orientation of the sealing assemblies as shown in the Figures, and are not intended to be limiting to the scope of the invention or to limit the invention scope to the preferred embodiments shown in the Figures. The presence of multiple embodiments herein use like reference numbers to refer to analogous features of the invention as described herein and as shown in the drawings, such that absent language to the contrary describing an alternative configuration for a particular feature, one skilled in the art would understand, based on this disclosure and the drawings attached hereto, that description of one such feature is applicable to an analogous feature in another embodiment herein unless otherwise specified. Further, words in the claims and specification hereof are intended to have their ordinary meaning to one skilled in the art as amplified or clarified by any further application-specific information, in the absence of an express, applicant-provided definition.

An LED light tube according to a preferred embodiment herein is described with reference to FIGS. 1-11 and 13A-13C. As shown in FIG. 1, the preferred embodiment described is referred to generally as LED light tube 100. The LED light tube 100 as shown has a hollow tube 102. The hollow tube may be formed of any of a number of materials known for use for light tubes in the art or to be developed for such purposes. The light tube may itself be transparent, opaque or translucent and can be used as both a tube and diffuser for LED light simultaneously, in which case the entire light tube would surround and cover the LED light chips and any accompanying lens. Alternatively, the hollow tube 102 may be made as a separate extrusion equipped to mount or hold any related LED parts and optional lens and diffusers. It should be understood to one skilled in the art, based on this disclosure that while a preferred light tube assembly for the visual aspects is shown for the purpose of demonstrating the invention, the light tube may be varied and used with the novel rotatable end caps described herein, and also be within the scope of the invention.

In a preferred embodiment as shown, the LED light tube's hollow tube is shown as an extrusion, so as to hold and mount other items in the LED light tube 100. The hollow tube 102 can be extruded or otherwise heat-molded of formed using metal, metal alloy or composite material which may optionally include conductive fillers or conductive particulate reinforcement. Suitable materials used include aluminum, aluminum alloys, glass, silicon-based polymers, polycarbonate, reinforced polyolefins, reinforced polyarylene ether materials and the like. Preferably, the hollow tube has high thermal conductivity and strength and is able to act as a heat sink to dissipate heat from the apparatus and/or includes a conductive material for charge dissipation or conduction as desired. In one embodiment, the extrusion is a lightweight aluminum or aluminum alloy material.

The hollow tube 102 is preferably shaped so as to provide one or more external features for securing the LED chips and related LED-functional parts as described further below. It is also preferably hollow both to reduce weight as well as to store operational component(s) 104 of the LED light tube 100, such as internal power supply or transformer shown representatively as component(s) 104, wiring and any other functional components as desired and as are known or to be developed in the art. Accordingly, the hollow tube 102 preferably includes a longitudinally extending passageway 106 that runs from a first end 108 of the hollow tube 102 to the second end 110 of the hollow tube. The exterior surface 112 of the hollow tube 102 is configured to have features 114 to seat a circuit board 116.

In one embodiment, the features 114 as shown are configured as a pair of spaced apart flanges 118 that are inwardly facing so as to define an inwardly-facing channel 120 shaped to receiving longitudinally extending opposite edges 122 of the circuit board 116. Such features 114 may also be modified to interact with an optional outer housing and/or diffuser 124. The optional outer housing 124 may be a translucent, transparent, or opaque material which is preferably strong and consistent in physical properties, and also preferably lightweight. Suitable materials include polycarbonate or glass.

The optional outer housing may be formed and have a clarity level so as to diffuse light coming from the LED chips on the printed circuit board. If so, optional housing 124 may be referred to also herein as diffuser 124. The diffuser 124 may be shaped to give an overall generally circular profile to the LED light tube and may be positioned on one portion of the hollow tube 102 or on more than one location on the hollow tube 102. As shown in the preferred embodiment herein, two diffuser housings are incorporated onto opposing sides of the hollow tube. To accommodate one or more such diffusers 124 shaped to fit over the circuit board 116 and the light emitting diodes, the features 114 (or other optional features if desired) may be modified further to include a pair of spaced apart flanges 126 that are outwardly facing so as to each define an outwardly facing channel 128. The diffuser 124 may thus be shaped such that on either side thereof, the outwardly facing channels 128 are each configured to receive the diffuser 124. As shown, the diffusers each have inwardly facing edges 130 that fit within the channels 128 to allow for a slidable construction which securely mounts the diffusers to the hollow tube 102.

Figure 3:
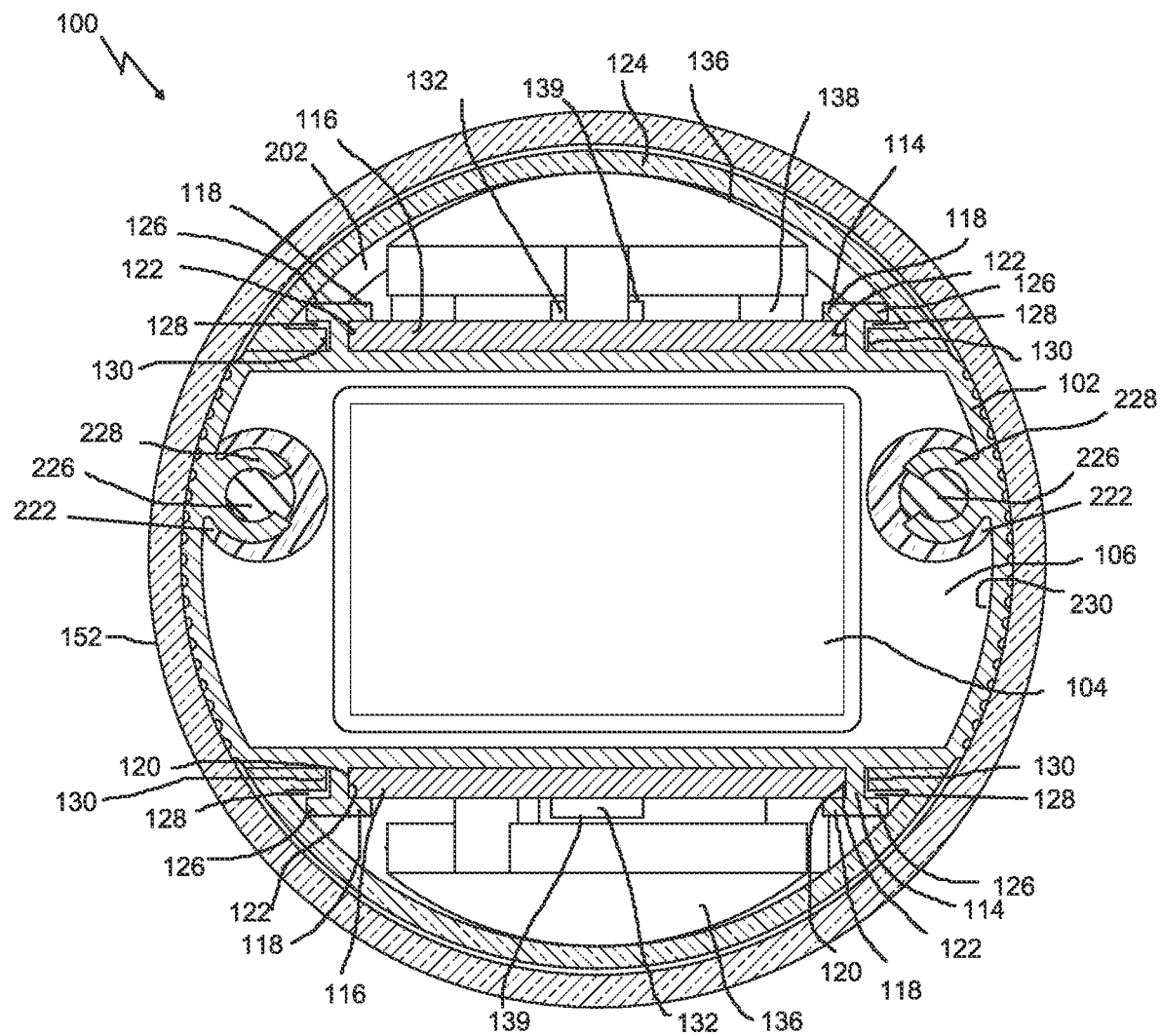
FIG. 3 is a transverse cross-sectional view of the LED light tube of the embodiment of FIG. 1 as shown in FIG. 4 and taken along lines 3-3.

In the embodiment shown, there are two circuit boards 116, such that the exterior of the hollow tube 102 includes features 114 on more than one location as described above. As shown in FIG. 3, such features 114 are on opposite sides of the hollow tube and incorporate inwardly facing flanges 118 and outwardly facing flanges 126, each defining respectively inwardly facing channels 120 and outwardly facing channels 128. The inwardly facing channels 120 accommodate the circuit boards 116, and the outwardly facing channels 128 receive inwardly directed edges 130 of diffusers/housing 124 to create an overall generally circular profile to the LED light tube 100. Each of the circuit boards used includes one or more light emitting diode chips 132. Preferably, a plurality of such chips 132 are provided. While two circuit boards 116 are shown, it should be understood that the hollow tube could be shaped in cross section to have four or more accommodating areas on the exterior surface 112 of the hollow tube 102. For example, if the hollow tube has a transverse cross-sectional shape that was more of a complete rectangle, or a triangle, a pentagon, a hexagon, etc., then the outer housing which may be a diffuser could be configured to fit completely over all sides as a single unit or configured to slide over each side in a manner as described above. The benefit of the present invention, is that however many circuit boards are provided (only one or two, three, four, etc.), the rotatable end cap assemblies as described further below, allow for self-positioning of the light direction, such that the LED light tubes may be used for maximum effects and illumination by rotating the tubes to shine light in a desired direction. By doing so, one can minimize the number of areas on the LED light tube requiring LED light chips, as each of the LED light tubes may be positioned facing varied locations, and multiple sided use to achieve the same effect is not necessary, even if the design can accommodate it. Thus, while not necessary, the LED light tube design herein may be made to have one, two, three or more circuit boards mounted on the outside thereof.

The LED chips themselves and the circuit board(s) are preferably in electrical communication, i.e., they are electrically connected through conductive material to one another directly or indirectly through another electrical component and/or are each in electrical communication with connectors as described further below that are connectible to an electrical power source. The circuit boards may include conductive material and/or wire to act as heat sinks and also dissipate LED heat and energy in the same manner as the hollow tube 102. Each of the circuit boards can accommodate a plurality of LEDs. As is customary in LED strips and other LED mounted tubes, multiple smaller lower wattage LEDs may be used or likely fewer larger, higher wattage LEDs may be used. The LEDs are preferably spaced uniformly. The LEDs may be mounted to the circuit boards using any suitable technique known or to be developed in the art. Preferably, the LEDs are mounted to the circuit board 116 by use of surface mount technology (SMT) soldering technology. Spacing 134 of LED chips 132 is preferably about 1.25 in. (3.18 cm) for most LED light tubes, but the distance can be varied based on the LED chips selected and the desired illuminance. Preferred distances between LED chips range from about 0.625 in. (1.588 cm.) to about 2.0 in. (5.08 cm) from center to center. LED chips are a nominal 1 W LED in preferred embodiments described herein. However, it is possible also to use 0.2 W to 0.5 W nominal LED chips within the existing invention as well, and the invention may also be modified should other LED chip sizes, power capacity and illuminance properties be developed.

Figure 13A:
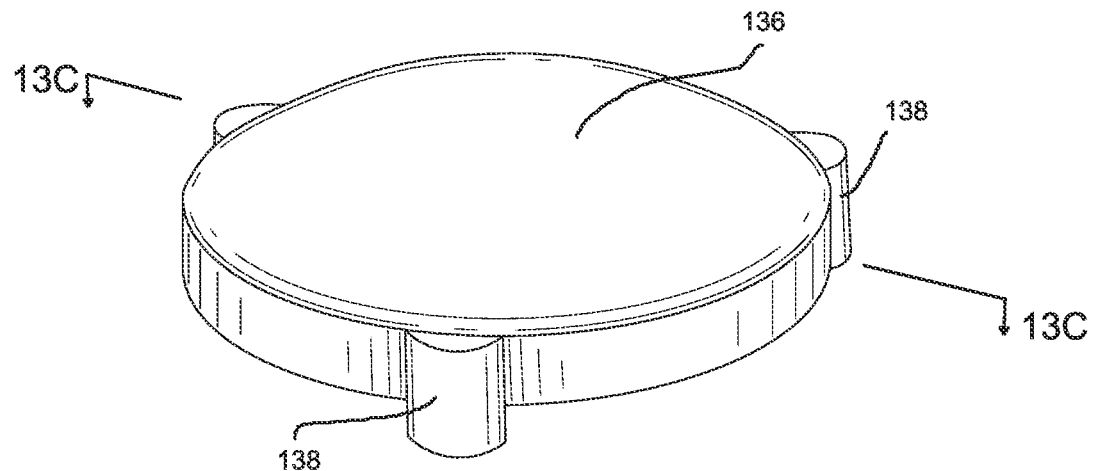
FIG. 13A is a perspective top view of a lens for an LED light for use in an embodiment of an LED light tube of the invention.
Figure 13B:
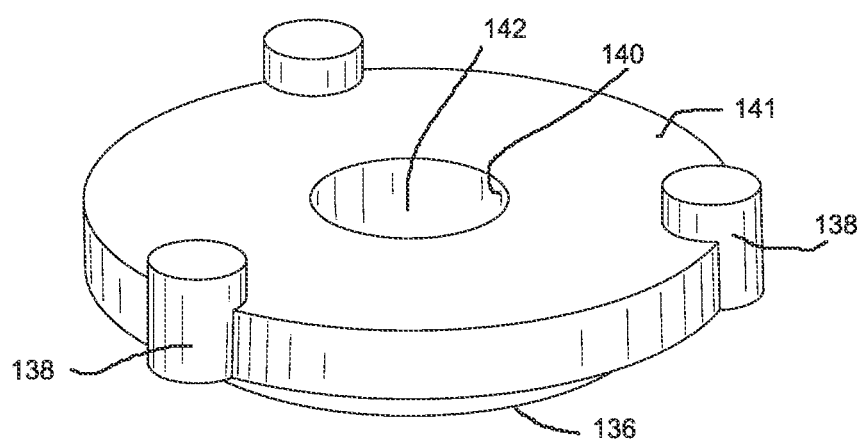
FIG. 13B is a bottom perspective view of the lens of FIG. 13A.
Figure 13C:
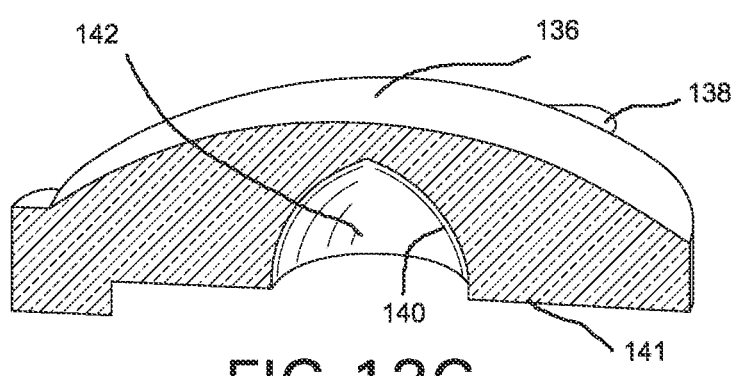
FIG. 13C is a longitudinal cross-sectional view of the lens of FIG. 13A taken along line 13C-13C of FIG. 13A.

In a preferred embodiment herein, one or more of the LED chips 132, and preferably all of them, is covered by a lens 136. The lens may be any of a variety of lenses available for use with LED chips. Preferably the lens is one that provides a wide array of light angle diffusion for each LED chip. As shown best in FIGS. 3 and 13A-13C, the lens 136 has a curved upper surface for directly the light outwardly. One or more supporting mounting legs 138 are provided for spacing the lens 136 above an LED chip 132. The mounting legs allow the lens to sit above the surface of the printed circuit board and over a top 139 of the LED chip 132 for allowing heat to escape and for mounting on the circuit board. As best shown in FIGS. 13B and 13C, the bottom surface 141 of the lens includes an internal portion 140 that defines a cavity 142. The cavity which as shown is a somewhat pointed dome-like structure allows for spacing from the LED chip 132 and the curvature thereof also helps for dispersing light in wider directional paths toward the curved outer surface as light moves from within the lens 136 to an area outside the lens prior to leaving through the housing which may be a diffuser 124. Multiple lenses are preferably provided such that each LED chip used has its own lens.

As shown in FIGS. 1-11, each of the LED lighting tubes 100 has a rotatable end cap assembly. A first and a second rotatable end cap assemblies 144, 146 are shown in the drawings. For purposes of explanation, while each of assemblies 144 and 146 is positioned on a first end 108 and a second end 110 of the LED hollow tube 102, respectively, as each are preferably the same, description of both assemblies is made with reference to assembly 144 as shown in perspective view in FIG. 11.

Figure 5A:
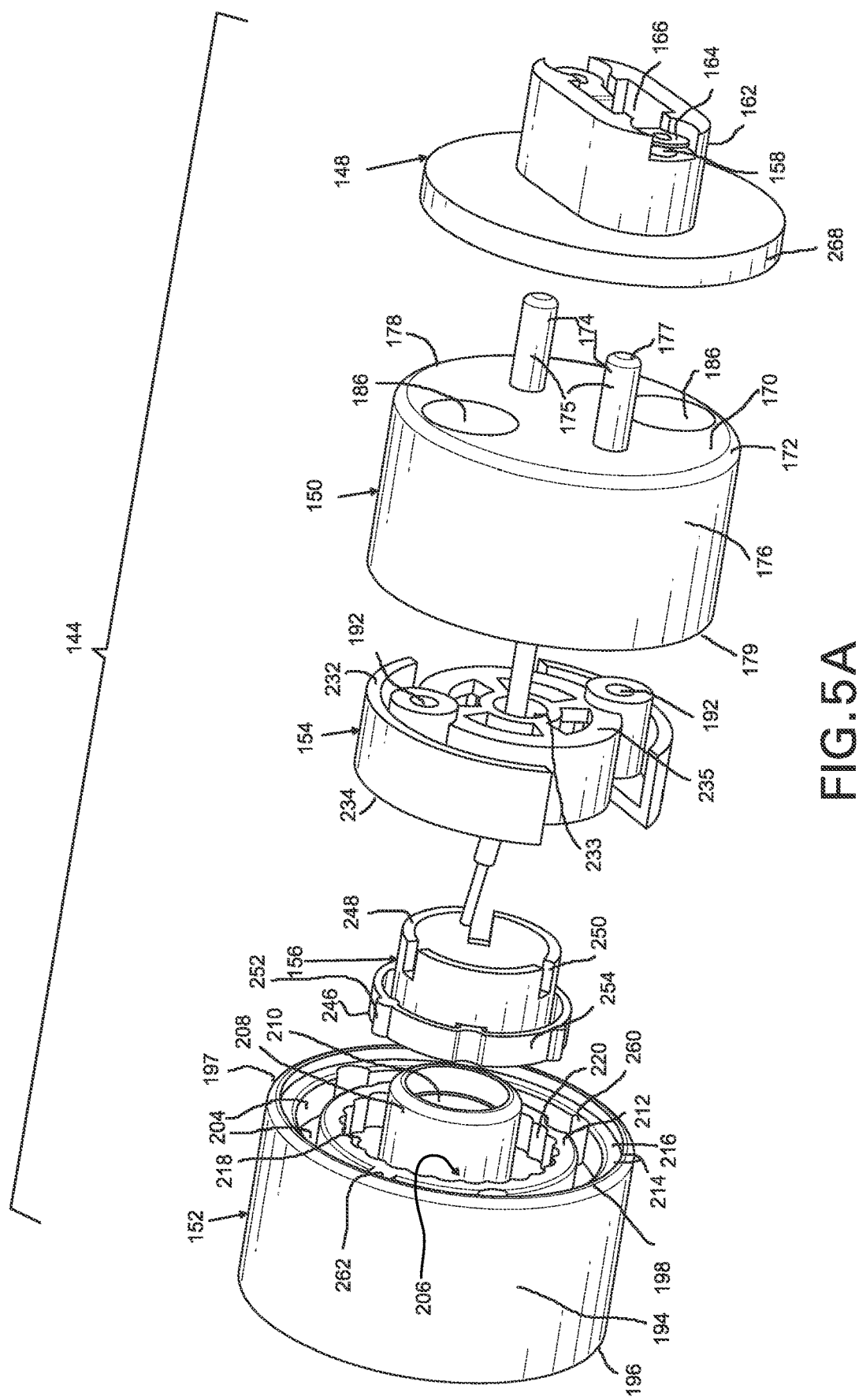
FIG. 5A is an exploded exterior end perspective view of an embodiment of the rotatable end cap assembly for use in the LED light tube according to FIG. 1.
Figure 5B:
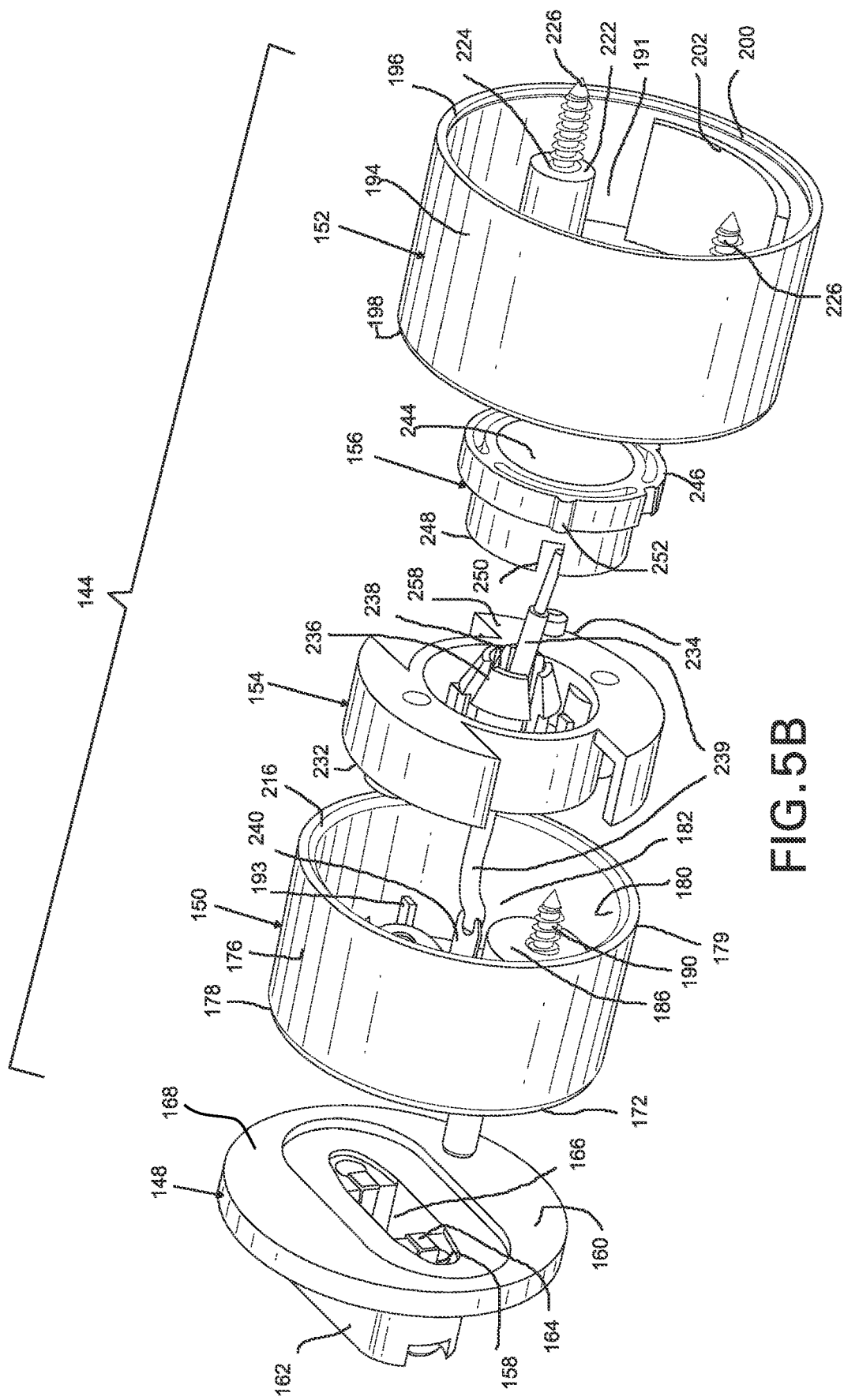
FIG. 5B is an exploded interior end perspective view of the embodiment of the rotatable end cap assembly of FIG. 5A.
Figure 6A:
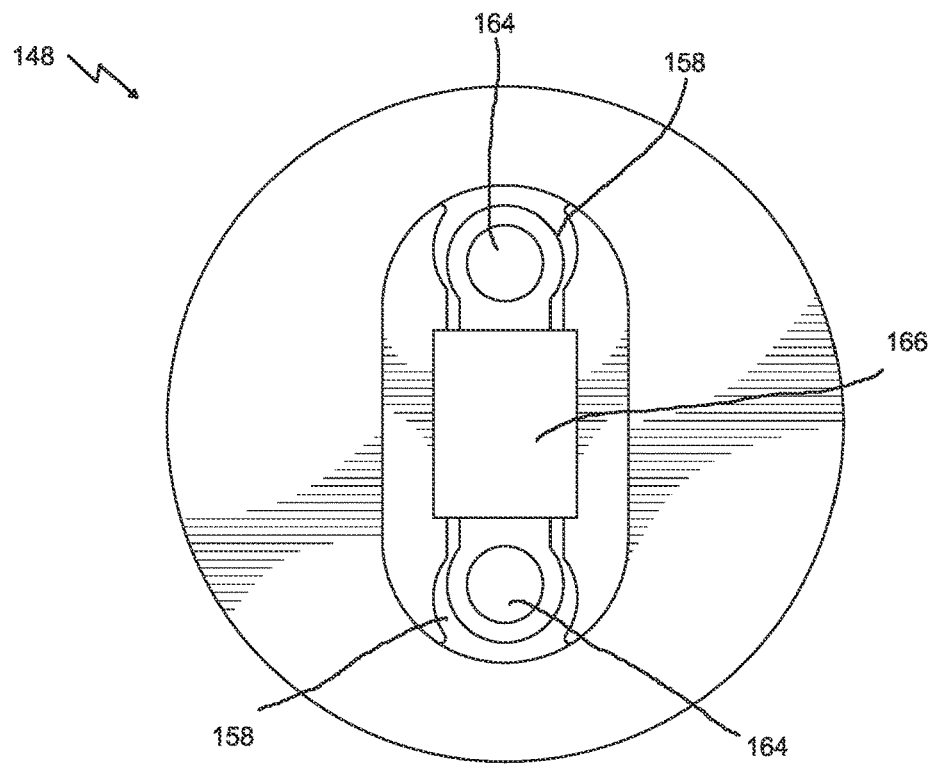
FIG. 6A is an exterior plan view of a socket cap of the embodiment of the rotatable end cap assembly of FIG. 5A.
Figure 6B:
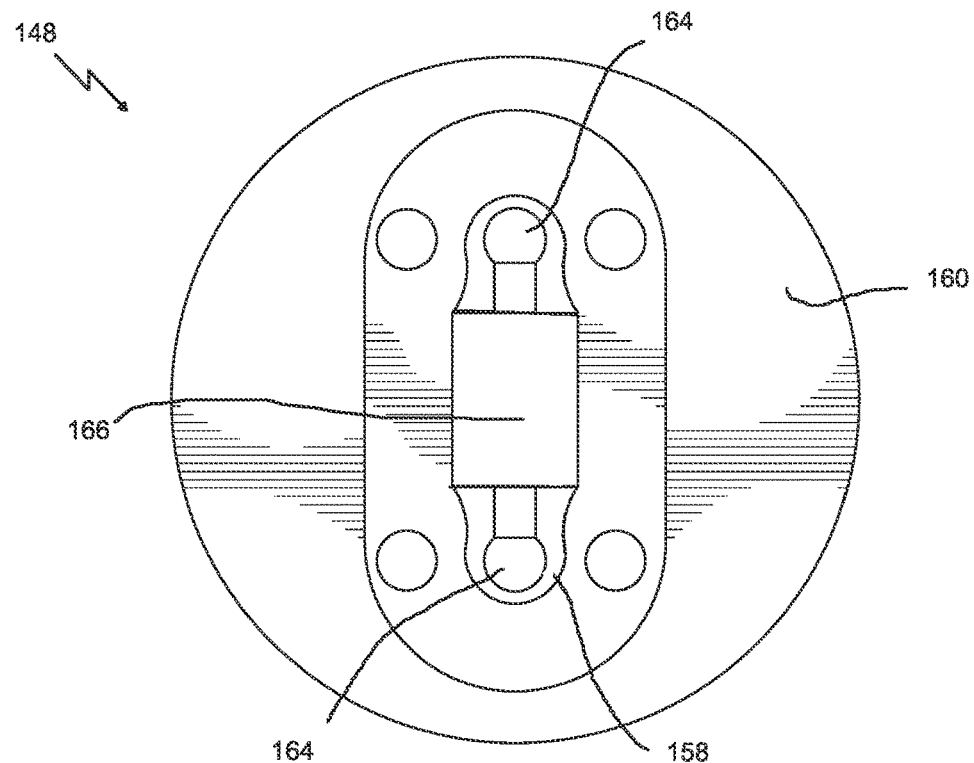
FIG. 6B is an interior plan view of the socket cap of FIG. 6A.
Figure 7A:
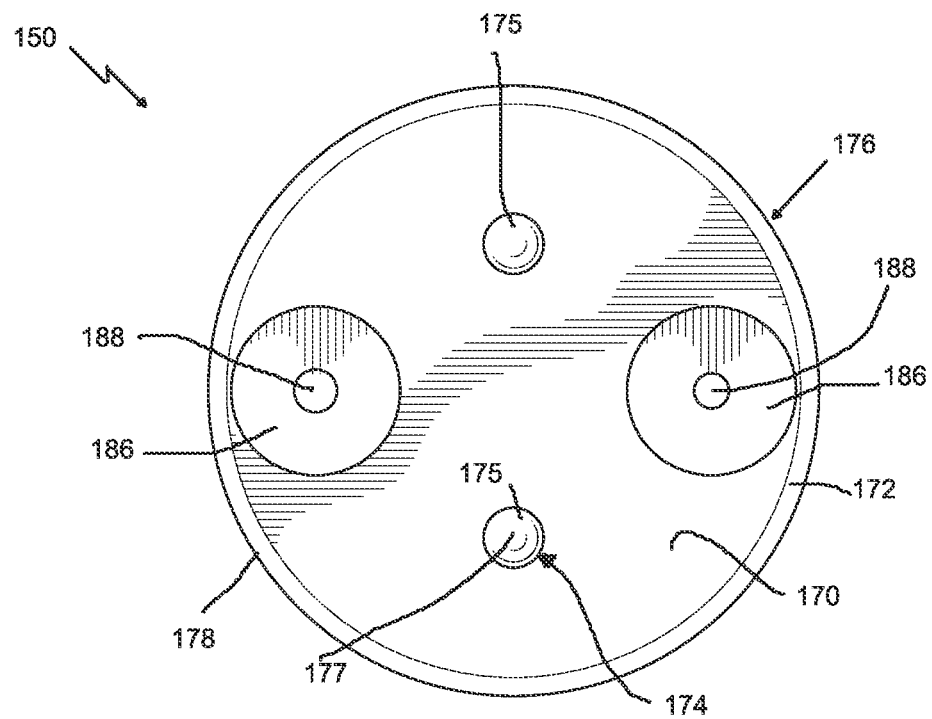
FIG. 7A is an exterior plan view of a plug of the embodiment of the rotatable end cap assembly of FIG. 5A.
Figure 7B:
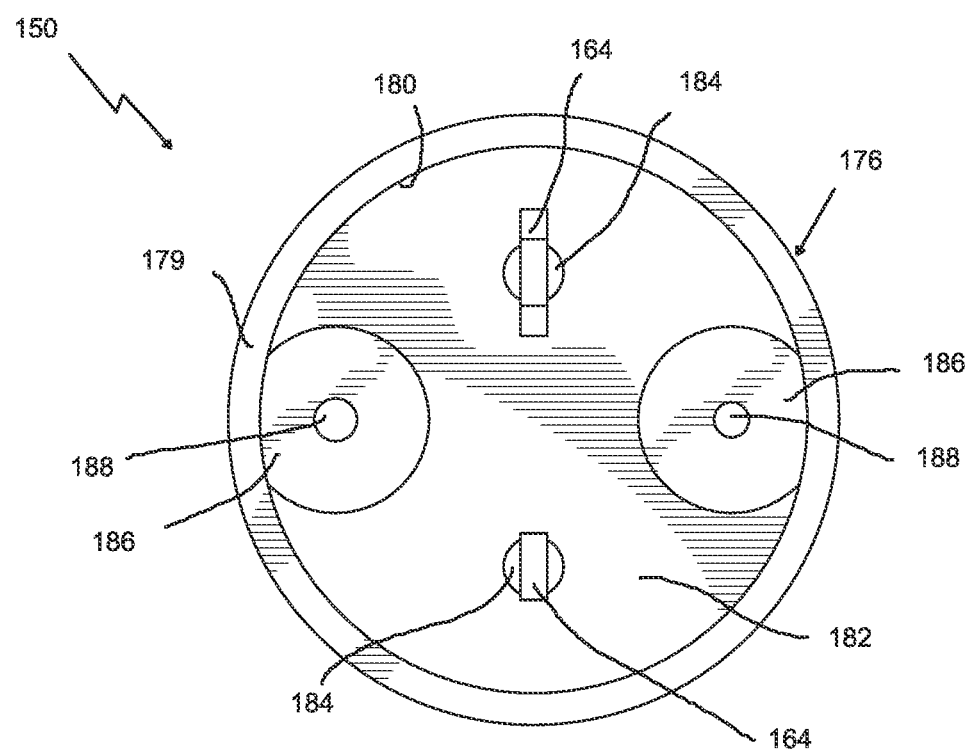
FIG. 7B is an interior plan view of the plug of FIG. 7A.
Figure 8A:
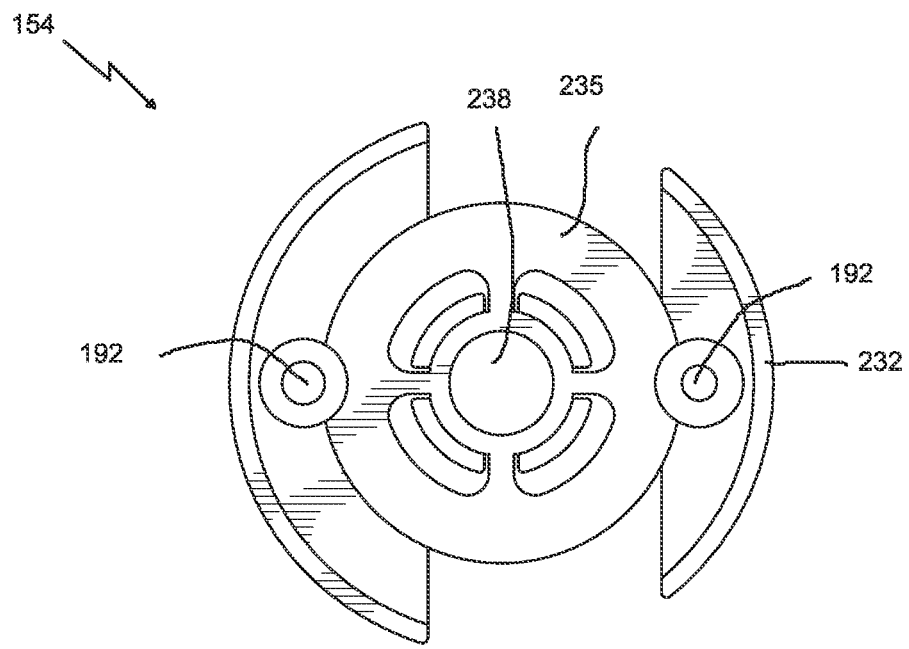
FIG. 8A is an exterior plan view of the cam locking mount of the embodiment of the rotatable end cap assembly of FIG. 5A.
Figure 8B:
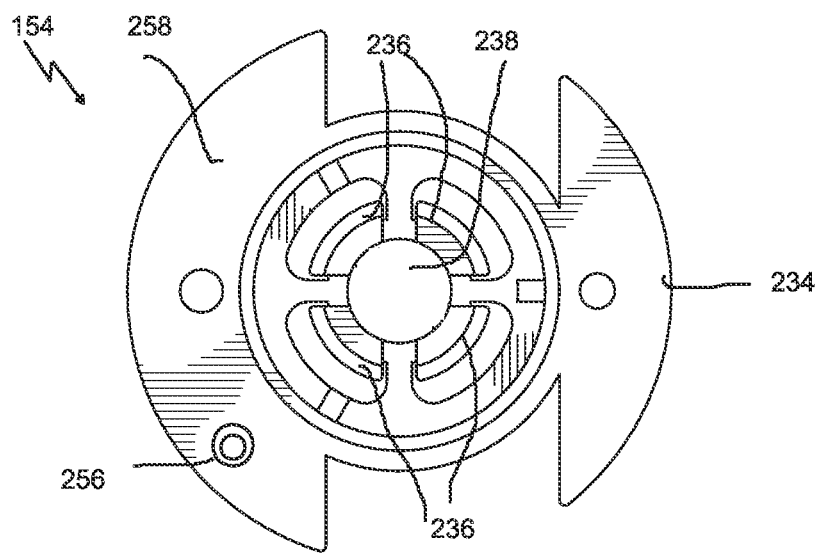
FIG. 8B is an interior plan view of the cam locking mount of FIG. 8A.
Figure 9A:
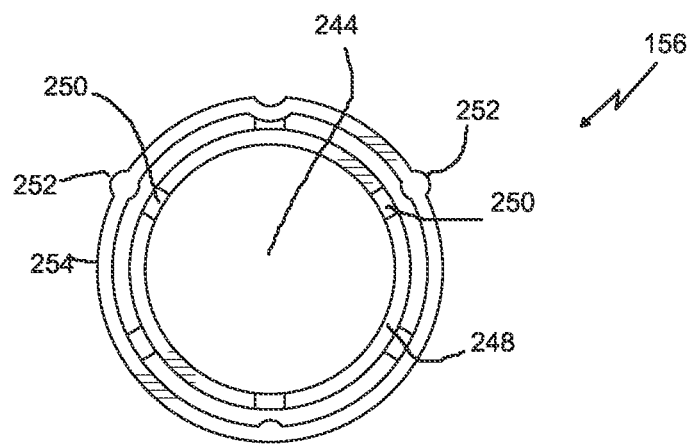
FIG. 9A is an exterior plan view of a rotation cam of the embodiment of the rotatable end cap assembly of FIG. 5A.
Figure 9B:
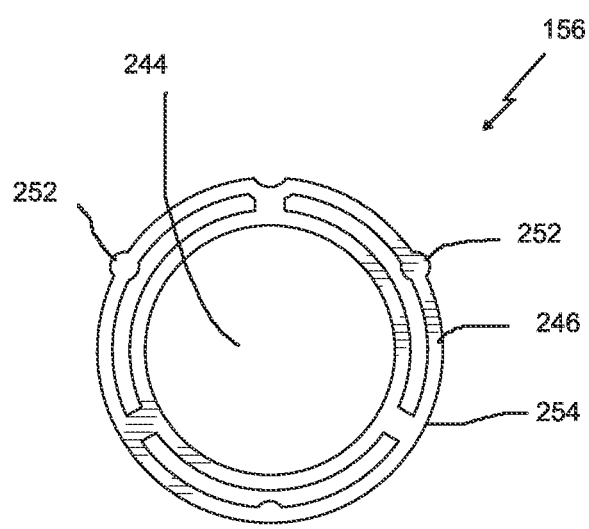
FIG. 9B is an interior plan view of the rotation cam of the FIG. 9A.
Figure 11:
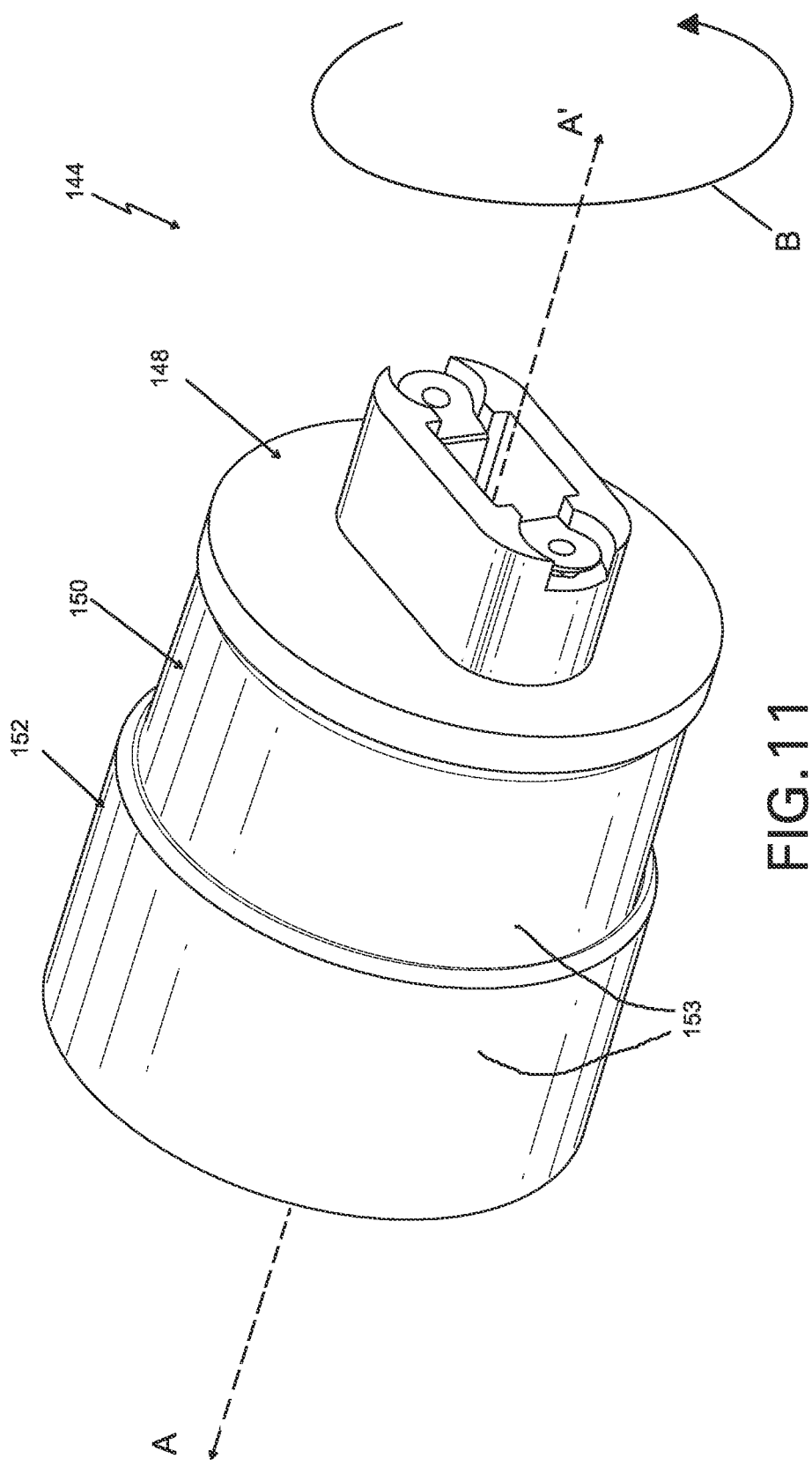
FIG. 11 is an exterior perspective view of the rotatable end cap assembly of FIG. 5A.

With reference to the rotatable end cap assembly as shown in FIG. 11, the assembly includes a socket cap 148, a plug 150 and a rotatable end cap 152. Each can be seen from the outer surface 153 of the rotatable end cap assembly. Each end cap assembly 144, 146 is able to rotate about a longitudinal axis A-A' running through the LED light tube and each end cap assembly. Rotation can be configured to be in either direction. As shown by arrow B, rotation occurs around the axis A-A'. As shown in FIGS. 5A and 5B, each assembly is mounted respectively on the first and second ends of the hollow tube as noted above. Each assembly comprises in addition to the socket cap 148, plug 150 and rotatable end cap 152, a cam locking mount 154 and a rotation cam 156.

The socket cap 148 and plug 150 operate together to provide electrical connection to an electrical socket in a light fixture into which the LED light tube is to be installed. With reference to FIGS. 4-6B, the socket cap 148 includes at least one hole 158 for receiving a connector 174 of the plug 150. As shown, two such holes 158 are openings extending from the bottom surface 160 of the socket cap 148 up through an extending portion 162 of the socket cap. The connector(s) 174 once inserted in the holes 158 will connect with conductive material 164 positioned to receive and contact the connector(s) 174 for carrying current from the socket 150 into the LED light tube. A further opening 166 is formed in the center of the extending portion 162 of the socket cap 148. The base 168 of the socket cap 148 is configured to fit over the top surface 170 and edges 172 of the plug 150, preferably in mating engagement, although direct physical contact along the entire surface 170 is not necessary.

With reference to FIGS. 5A, 5B, 7A and 7B, the plug 150 is shown as having connector(s) 174 and plug body 176 with an exterior end 178 and an interior end 179. The connector(s) as shown include two such connectors 174 in the form of prong(s) 175 extending longitudinally from an exterior end 178 of the plug body 176 of the plug 150. The prongs 175 or other connectors as may be used and as noted above pass through the holes 158 in the socket cap 148 and contact the conductive material 164 in the socket cap on one end 177 of the prong 175 connector(s) 174. The plug 176 body has a lower, interior facing surface 180 on the interior end 179 of the plug body 176. The interior facing surface defines an interior space 182.

The interior-facing, other end 184 of the prong connector(s) contacts further conductive material 164 positioned on the lower, interior surface 180 of the plug body 176. At least one of the plug body 176 and the cam locking mount 154 are each configured to be secured together. The two parts may be fastened to be secured in any typical manner such as by adhesive, snap fit connectors, interlocking tabs, projections and mating grooves and the like. As shown in the preferred embodiment herein, one or both of the cam locking mount and the plug body is shaped to receive a fastener such as a screw. As shown, a screw receiving bore 186 is formed on the interior surface 180 of the plug body and defines an opening 188 therein for receiving a screw 190. The cam locking mount 154 as shown includes a mating hole 192 formed in another bore on the cam locking mount for receiving the screw 190. One skilled in the art would understand based on this disclosure that the parts could also be reversed putting the receiving bore on the cam locking mount and the hole on the plug body such that the fastener could be directed in either direction on the assembly. As shown, two such fasteners are provided on the plug body and cam locking mount. In addition, one or more guides 193 may be provided on the interior surface 180 of the plug body to position the cam locking mount for securing the two together.

Figure 2:
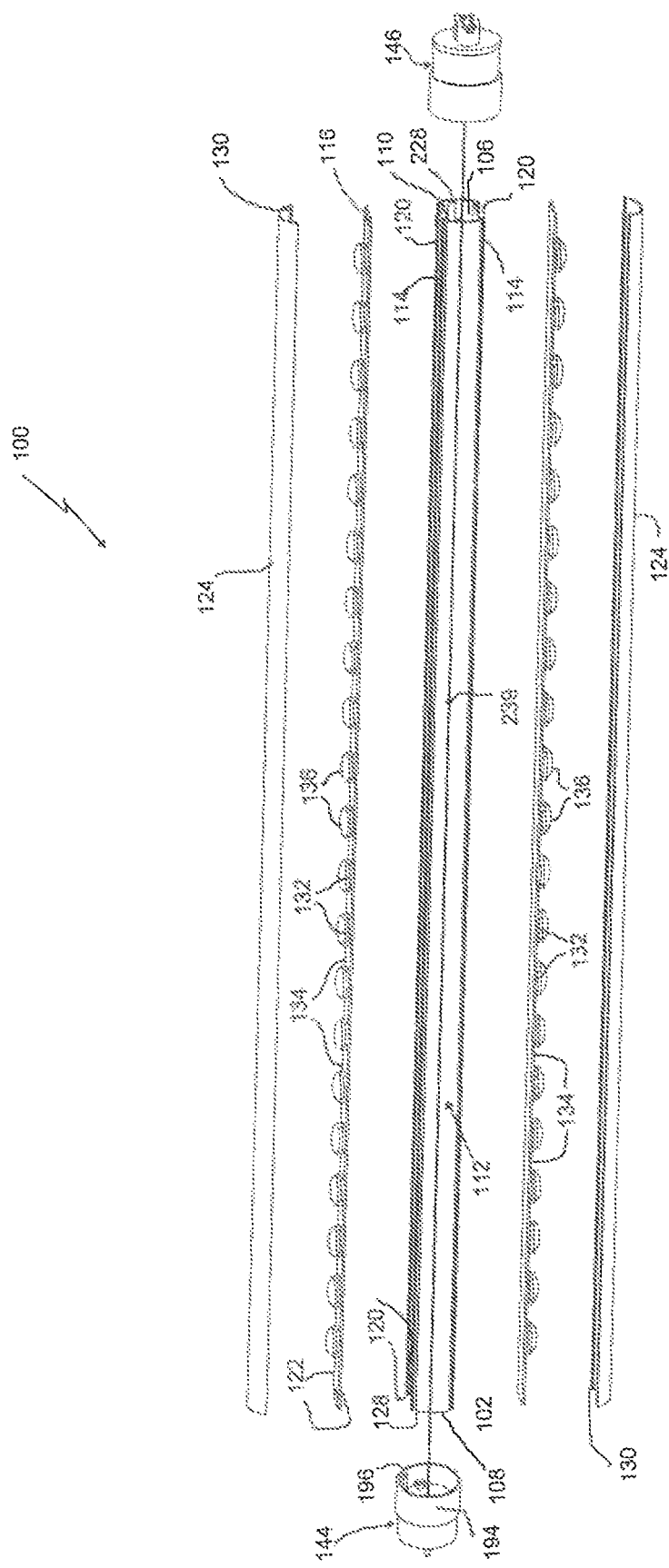
FIG. 2 is a an exploded view of the rotatable LED light tube.
Figure 4:
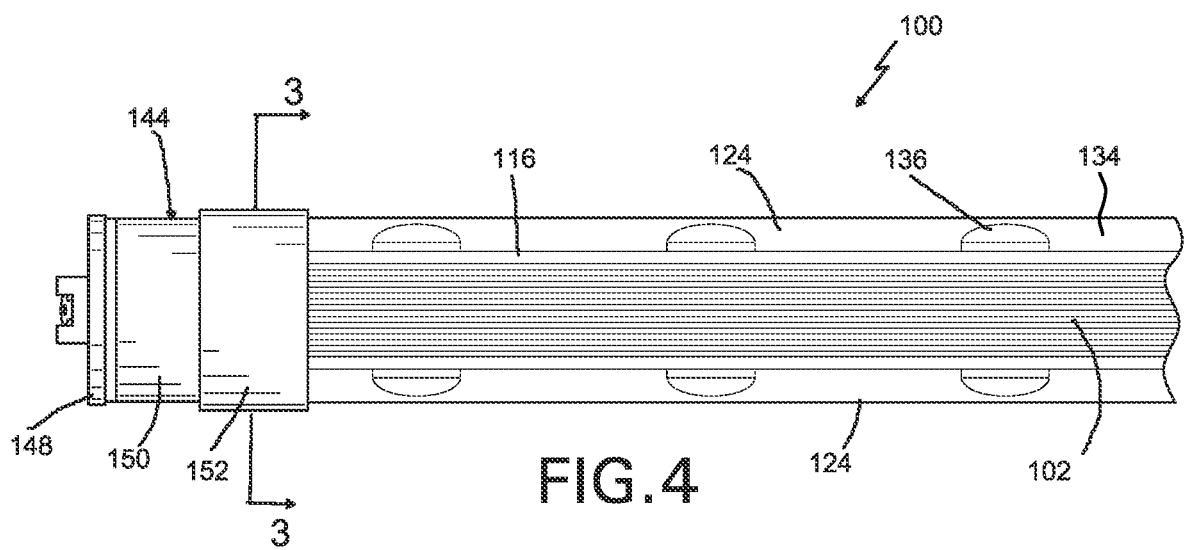
FIG. 4 is a partially broken, enlarged view of an end cap assembly on the rotatable LED light tube of FIG. 1.
Figure 10A:
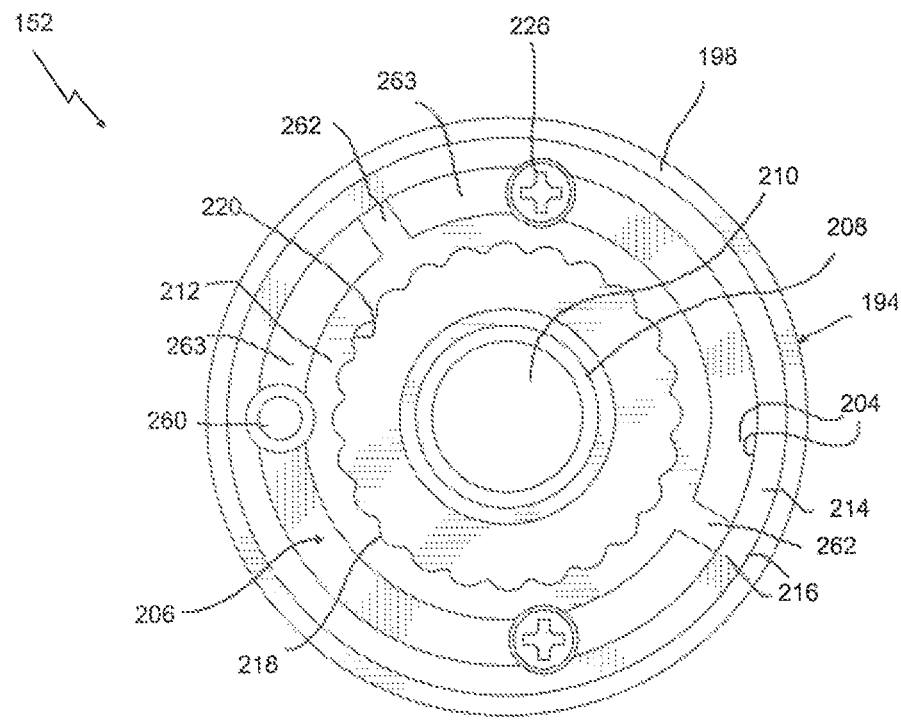
FIG. 10A is an exterior plan view of the rotatable end cap of the embodiment of the rotatable end cap assembly of FIG. 5A.
Figure 10B:
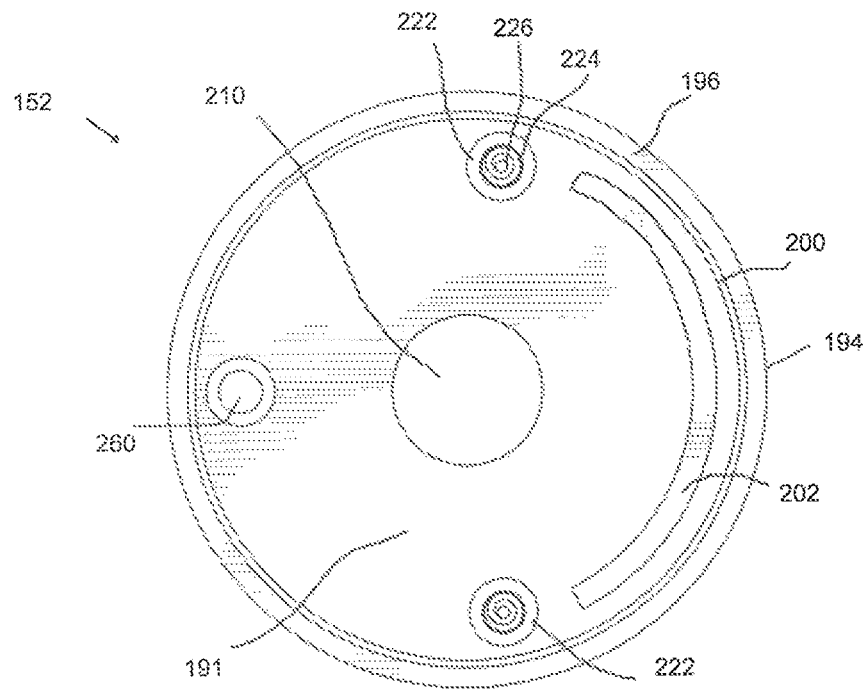
FIG. 10B is an interior plan view of the rotatable end cap of FIG. 10A.
Figure 10C:
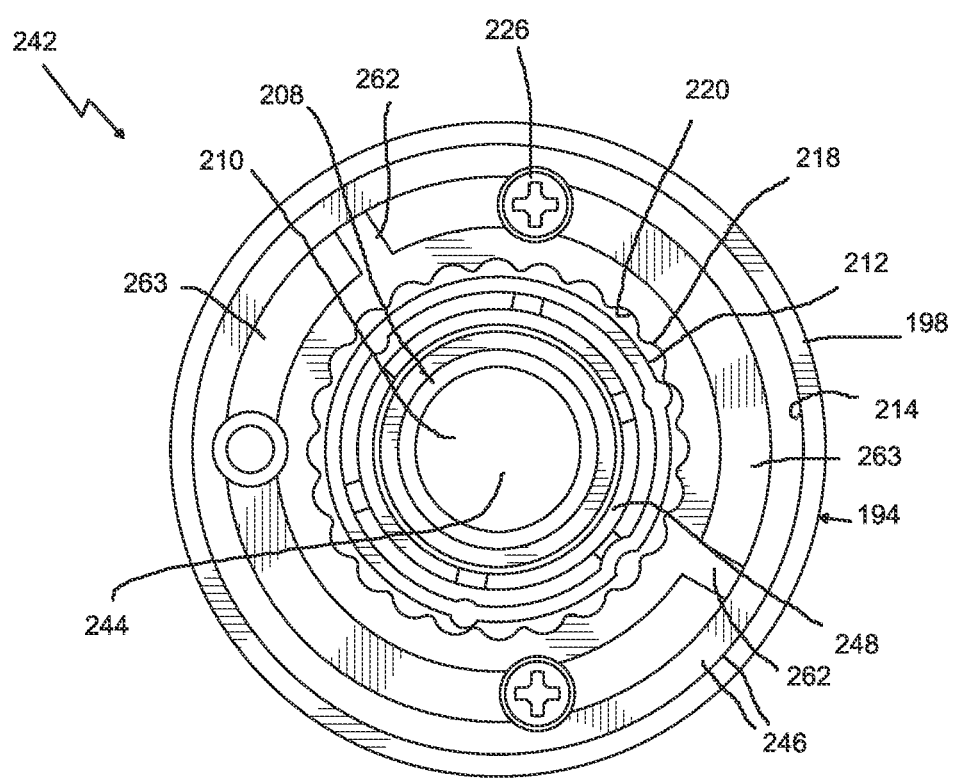
FIG. 10C is an exterior plan view of a subassembly of the rotatable end cap and rotation cam of the rotatable end cap assembly of the embodiment in FIG. 5A.

With references to FIGS. 5A, 5B, 10A, 10B and 10C, the rotatable end cap 152 has an end cap body 194 having an interior first end 196 and an exterior second end 198. As shown in FIGS. 5B and 10B, the first end 196 is configured to engage one of the first or the second ends of the hollow tube 102. As shown in FIGS. 2-4, one end 108 of the tube 102 is sized and configured to fit securely in an area 191 defined within the interior first end 196 of the end cap body. Each end 106, 108 of the tube 102 may fit within respective areas 191 within each of the first ends 196 of the end cap bodies 176 of each of the rotatable end cap assemblies 144, 146. Depending on the shape of the hollow tube, an additional housing may be provided or partial housing as shown, wherein the partial housing is also a diffuser(s) 124. The overall structure of the hollow tube and attached components fits within the area 191 of the end 196 of the end cap body. As shown, the end 196 has a slightly beveled edge 200 for receiving the tube. A further guide bevel 202 may be provided as well for positioning the end 108 of the hollow tube 102 into the first end 196 of the end cap body 194.

The second end 198 of the end cap body 194 is characterized by a formed surface having numerous features thereon. An inner surface 204 of the second end 198 which runs along the inside of the second end 198 defines a general recess 206 therein, i.e., an area that is defined at least partially within the confines of the second end 198 as described further herein. The inner surface 204 defines at least one longitudinally extending bore 208 that extends through the rotatable end cap through the inner surface 204 through the recess 206 and terminates either substantially in line with or extending interiorly beyond a perimeter edge 197 of the second end 198 of the end cap body 194. The longitudinally extending bore 208 defines a passageway 210 therethrough. The inner surface 204 also defines a longitudinally extending collar 212 which is situated within the recess 206. The collar 212 is preferably situated between the inner surface 204 and the longitudinally extending bore 208 and is preferably spaced inwardly from a side portion 214 of the inner surface 204 and spaced from the longitudinal extending bore 208.

The second exterior end 198 of the end cap body 194 preferably also includes a stepped down or beveled exterior edge 216 configured to receive a mating beveled edge 216 on the plug body 176 of the plug 150, wherein the plug is preferably seated within the rotatable end cap 152. Thus the plug body 176 is configured so as to be received at least partially within the second end 198 of the rotatable end cap. Other configurations for seating the plug body and the rotatable end cap may also be used, such as reversing the ends, having one piece slide within the other using mating pieces and the like. However, for rotational purposes it is preferred that the two pieces are seated so as to be rotatable with respect to one another and to have slidable end surfaces where the edges are seated. It is preferred that the end cap body, the plug body and the socket cap are all formed of a moldable thermoplastic material that is suitable for use with electrical components, such as a conductive polyolefin, a polyarylene, polyarylene ethers, polycarbonate, an acrylonitrile-butadiene-styrene, a polyimide, polyetherimide, polystyrene or the like. It is also preferred that the parts are durable and have good frictional and strength properties.

The collar 212 noted above is preferably configured to include a surface 218 facing the longitudinal axis of the LED light tube that has one or more engaging features 220 thereon. As shown the features formed are concave curved surfaces in succession around the surface 218. Such features may be varied, but are preferably shaped so as to successively receive and engage outward extending feature(s) described below on a first side edge of the first end of the rotation cam 156 for controlled rotation.

The end cap body may also include one or more fastener receiving bores 222 having an opening 224 therein, such as for receiving one or more fasteners. An additional optional opening 260 for a bore is also provided. For example, as shown, fasteners may be screws 226. In an optional embodiment, as shown with respect also to FIG. 3, features 228 may be provided on an interior surface 230 of the hollow tube 108. Such features may act to either engage a portion of a fastener such as screws 226, act as a stop in inserting the end of the hollow tube into the first end 196 of the end cap body 194 or also function to run wire in a secure manner through the passageway 206 through the tube 108. Preferably, the features act to engage a portion of a fastener such as screws 226.

The cam locking mount 154 is designed to be seated in the plug body as noted above. The cam locking mount 154 has an exterior facing side 232 and an interior facing side 234. The exterior facing side 232 is configured to be positioned in the interior space 182 of the plug body 176 and has an opening 233 that is axially aligned through the surface 235 of the exterior facing side 232. The interior facing side 234 of the cam locking mount 156 includes longitudinally extending projections 236 configured to be received within the passageway 210 of the longitudinally extending bore 208 of the end cap body 194.

Such projections 236 may be of a variety of configurations provided they can easily and preferably snugly fit into the bore 208 and be received in the passageway 210 a manner in which the projections form a longitudinally extending opening 238 therebetween that is smaller than the opening 233 on the other side 232 of the cam locking mount 154 when compressed and of a similar size when not compressed, but that in either condition is aligned axially with opening 233. The opening 238 preferably is in axial alignment with the longitudinal passageway 210 in the bore 208 of end cap body 194 of the rotatable end cap 152. To provide some flexibility for a variety of wiring, the opening 238 and the bore passageway 210 are sized to receive and secure conductor wiring such as wire 239 running from conductive material 164, preferably formed as a wire connector 240 in the interior space 182 of the plug body 176 which connector 240 is in electrical communication with the conductive material 164 of the socket cap and the prong connectors 175. The projections 236 may be formed so as to be flexible for movement of the wire in rotation while holding it securely within the passage to avoid disconnection. The material may be formed of the same or a softer or more flexible material than the cam locking mount 154. Such more flexible materials may include polyolefins and similar materials, but other materials such as those noted above may be used provided they operate to achieve the same functional benefits. Flexible projections 236 that are spaced apart and come together on pressure during insertion to form an opening 238 are shown in FIG. 5B.

The rotation cam 156 is generally of a tubular shape and preferably formed of a more flexible material than the rotation end cap body 194 and also preferably formed of a material having good sliding friction properties yet sufficient strength to successively engage the concave features 220 on the interior surface 218 of the collar 212 of the end cap body 194. As shown in FIGS. 5A, 5B, 9A, 9B and engaged within the collar 212 in subassembly 242 of FIG. 10C, the rotation cam has a tubular shape that defines a passageway 244 that extends through the rotation cam. The rotation cam has a first interior end 246 that is configured and sized to be positioned in the recess 206 in the second end 198 of the end cap body 194 of the rotatable end cap 152 so that the first end 246 of the rotation cam 156 is positioned between the collar 212 and the longitudinally extending bore 208 of the rotatable end cap 152. The inner surface 218 of the collar 212 having features 220 thereon is configured to be received and engage the first end 246 of the rotation cam. The rotation cam 156 also has a second exterior end 248 that is configured to be received in the cam locking mount 154 so as to be situated around the projections 236 and seat within the locking mount in a rotatable manner.

Thus, the wire 239 or other wiring in the rotatable end cap, extends longitudinally through the longitudinally extending opening 238 between the projections and also through the passageway 244 of the rotation cam 156 and through the opening 233 in the exterior facing end of the cam locking mount and further through the passageway 210 in the bore 208 of the rotatable end cap body and then through the interior facing end 196 of the rotatable end cap body so as to connect to additional wiring 238 extending through hollow tube and in electrical communication with the internal electronic components of the LED light tube such that the LED chips, circuit boards, LED light tube electronic components and the rotatable end caps are all in electrical communication through the socket caps with sockets for receiving the LED light tube. One skilled in the art, based on this disclosure would also understand that the at least one connector(s) 174 in the form as shown of two prongs 175 are in electrical communication with a conductive material 164 through which the rotatable end cap assemblies 144, 146 are also in electrical communication with the socket designed for receiving the LED light tube and also through wiring extending through the rotatable end cap assembly from conductive material 164 in connector 240 such that the connector(s) 174 are also in electrical communication with the circuit board and LED chips and other LED components in the light tube.

The rotatable end cap 152 by way of the end cap body 194 is capable of controlled rotation with respect to the plug body 176 of the plug 150 and the cam locking mount 154 by rotation of the rotation cam 156 within the collar 212. The second end 248 of the rotation cam 156 has features such as slots 250 that that hold the rotation cam 156 stationary in the cam locking mount 154. Thus, when the plug, socket cap, cam locking mount and rotation cam, all move as one assembly with respect to the rotation end cap. As the rotation cam 156 moves, an outward extending feature 252 on a side edge 254 of the first end 246 of the rotation cam 156 can be successively received in features 220 on the inner surface 218 of the collar 212. As shown, the concave features 220 are configured to receive an engage a convex projection shown as feature 252 on the first end 246 of the rotation cam 156. The successive engagement provides a controlled rotation over 360 degrees.

In one embodiment hereof, rotation can be constrained further to less than 360 degrees, including less than 190 degrees and less than 180 degrees if desired by way of an additional stop feature. A stop 256 may be provided to a surface 258 of the interior facing side of the cam locking mount. The surface 258 preferably extends at least partially peripherally around the longitudinally extending projections 236 of the cam locking mount 154. There may be more than one stops 256 as well depending on the rotational effect desired. The at least one stop 256 projects upwardly from the surface 258 and can be arranged to engage areas 263 between web feature(s) 262, although other interactive stop features may be used. The web features 262 are positioned in the recess proximate the edge 216 of the inner surface 204 of the second end 198 of the end cap body 194 of the rotatable end cap 152.

In use, the light tube assemblies 100 of the present invention may be installed in a new sign assembly having sockets capable of receiving LED light tube assemblies preferably including the light tube assemblies 100 herein. In addition, the LED light tube assemblies herein having the rotatable end cap assemblies as described may be used for installation in a sign assembly comprising at least one fluorescent light tube through a retrofitting method. In each case, the method will be described with respect to a representative sign assembly 300. However, with respect to the method of installing LED light tubes as described herein into a new LED-ready sign assembly, the light assembly 300 would include LED-ready sockets and would not incorporate a fluorescent light ballast as shown and described herein with respect to FIGS. 12A-12D. The general structure and frame of the assembly are otherwise the same such that for brevity, FIGS. 12A-12D will be used for reference for both installation methods.

In a method for retrofitting at least one LED light tube herein in a sign assembly, such as assembly 300, in a first step, a sign assembly 300 is provided which includes at least one light tube 302 having a connector 304 in a connector end of the tube 302 which may be any connector used by those skilled in the art. Preferably, in the retrofitting method, the connector is a standard connector as is used in an existing fluorescent light tube for a sign assembly and the light tube 302 is a fluorescent light tube. Typical fluorescent light tubes used for this purpose are T8HO and T12HO type tubes. The LED light tubes 100 of the invention herein may replace existing fluorescent tubes and use existing R17d ANSI base fluorescent lamp holders and sockets already in place in the sign assembly 300.

The sign assembly 300 has at least one fluorescent tube in a preferred retrofitting method embodiment. It further includes at least one translucent side plate 306, and a frame structure 308 capable of securing a perimeter 310 of the at least one translucent side plate 306. The frame structure and translucent side plate(s) may have a variety of perimeter shapes so as to accommodate a variety of sign assembly designs. As shown, the frame and plate are a simple box design. One skilled in the art would understand based on this disclosure that more complex signs of varying shapes may be made provide opposing sides of the frame structure include or are extended through internal framing to include electrical sockets in tube holders within the frame. As shown, the frame structure 308 has an interior surface 312 having at least two opposite sides 314 spaced from each other.

The sides 314 each include light tube holders having sockets 316 therein for receiving connectors 304 inside thereof for electrical communication. The light assembly further includes wiring 318 for connecting the electrical sockets/holders 316 through a ballast 320 to an electrical source 322. Such fluorescent light assemblies are well known in the art and are shown here only in a representative manner for purposes of explaining the method steps herein.

Figure 12A:
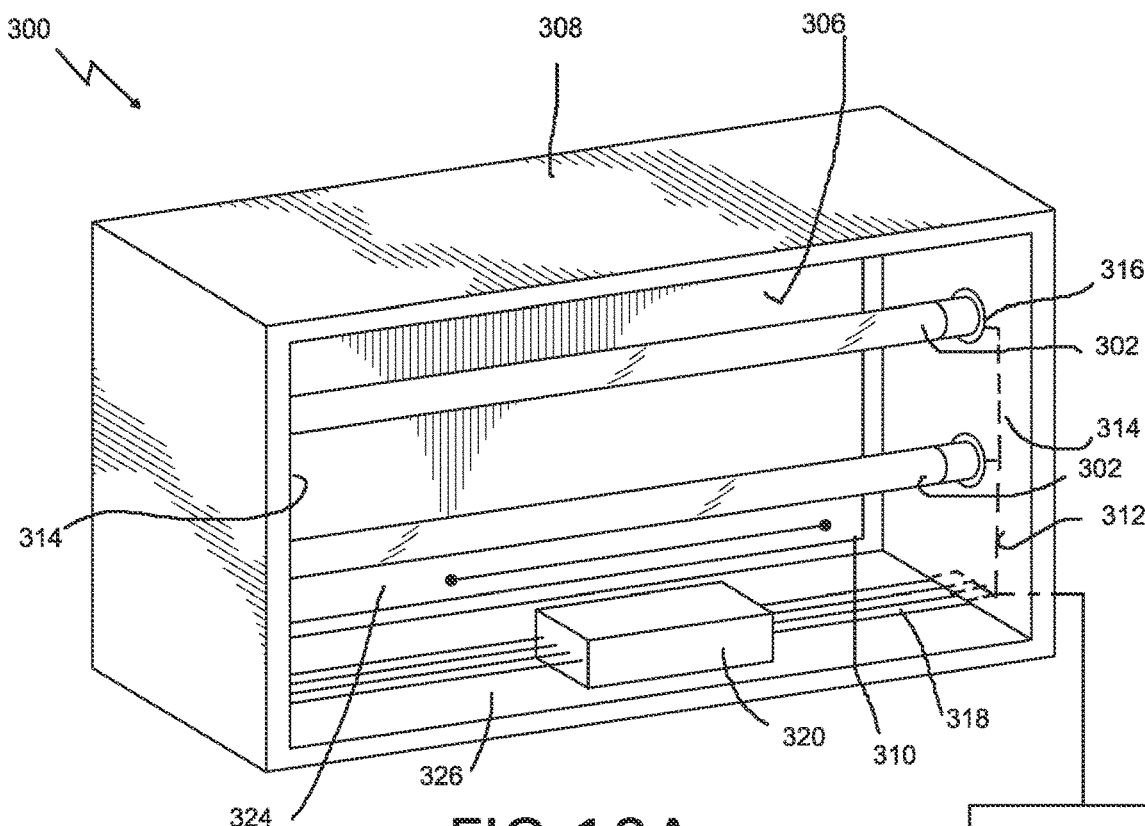
FIG. 12A is an open view of a two-sided sign light box assembly having fluorescent tube lights installed therein and one translucent panel removed.
Figure 12B:
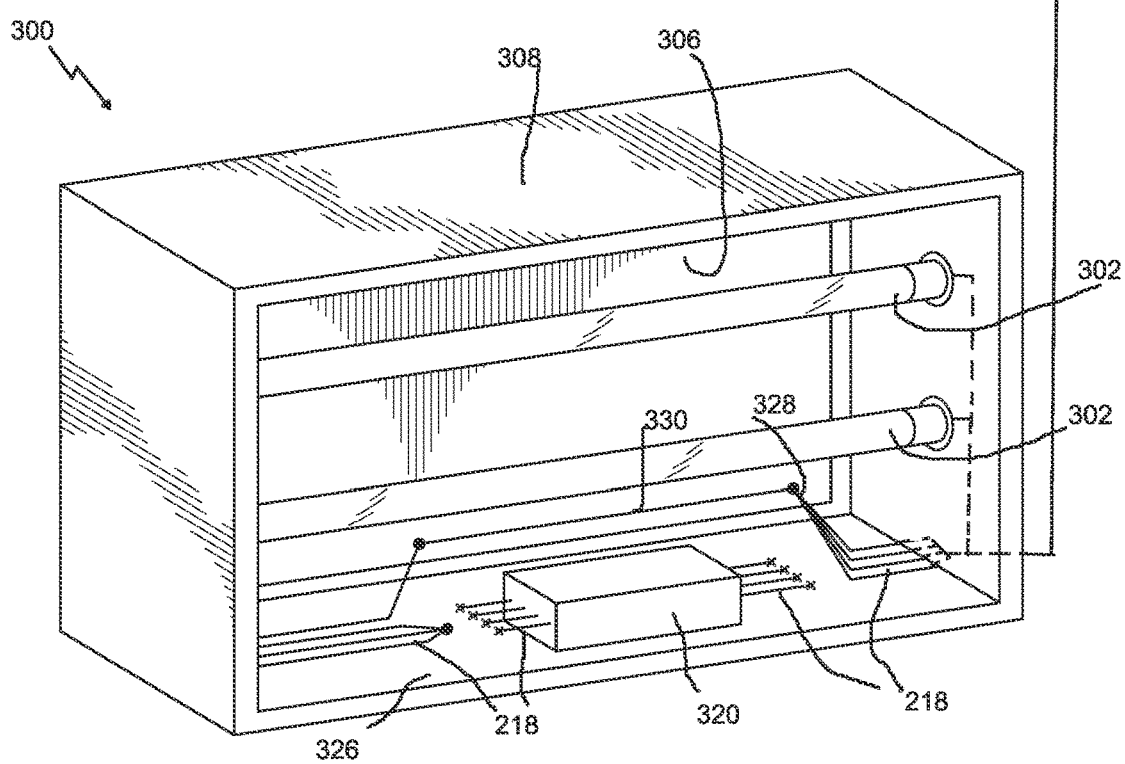
FIG. 12B is a view of the sign light box assembly of FIG. 12A with the wiring in connection with the fluorescent tubes and ballast being disconnected from the ballast and bypassing the same.

In the method, preferably, the power is shut off to the sign assembly before beginning. The open side area 324 could also include a second translucent plate 306 thereon or could have a solid removable backing. One or both of the plates are removed or the backing removed to open the sign assembly so as to access the at least one fluorescent light tube 302 as in FIG. 12A. If a raceway 326 is present and has a cover over the ballast 320 as are known in the art, the cover should be removed to expose the raceway 326 and wiring 318. The wiring around the ballast that extends to each side to the electrical sockets is then disconnected as shown in FIG. 12B. The wires are capped. The disconnected ends 328 created by the disconnection step on one side of ballast 320 of the sign assembly are connected and capped and joined to a bypass wire 330 connected to at least one of the other disconnected wires 332 on the opposite side of the ballast, creating an electrical bypass of the ballast as shown in FIG. 12B. The fluorescent tubes are then removed leaving an empty sign assembly with lamp holders with open sockets 316 as in FIG. 12C.

Figure 12C:
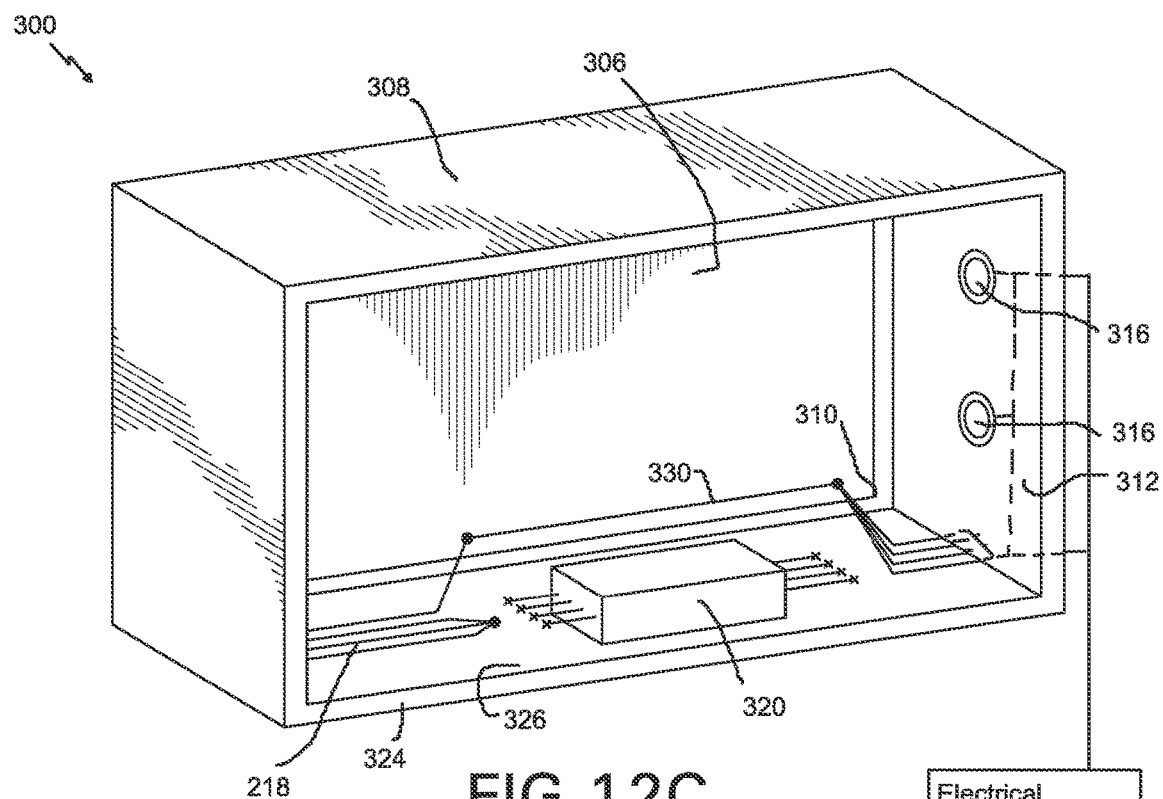
FIG. 12C is a view of the sign light box assembly of FIG. 12A with the fluorescent light tubes removed.
Figure 12D:
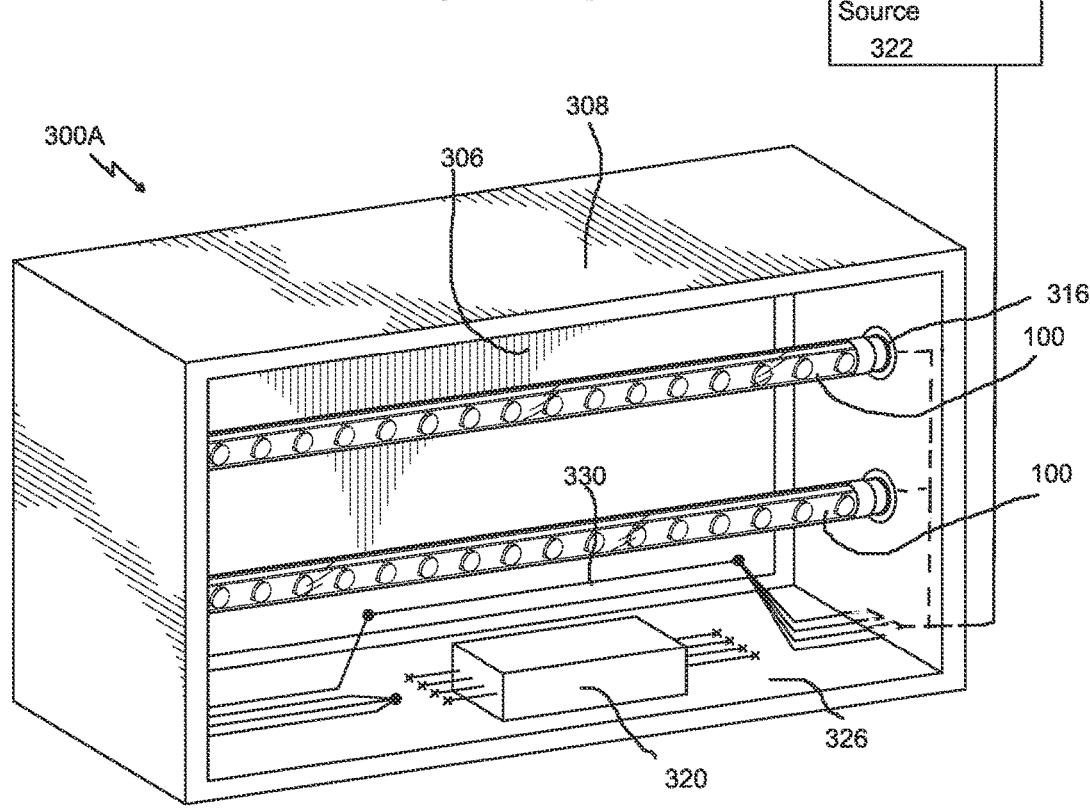
FIG. 12D is a view of the sign light box assembly of FIG. 12A with LED light tubes according to an embodiment of the invention installed in place of fluorescent tubes.

At least one LED light tube such as LED light tubes 100 of the present invention is installed in the sign assembly 300 with each of the rotatable end cap assemblies 144, 146 inserted in a socket 316 such that connectors 175 in socket cap 148 are capable of providing electrical communication to the LED light tubes 100 to form a retrofit light tube assembly 300A as shown in FIG. 12D. Each of the LED light tubes 100 incorporated in the LED retrofit light tube assembly 300A preferably includes on each end the rotatable end cap assemblies as described in preferred embodiments herein. The method may further comprise rotating one or more of the LED light tubes by way of the rotatable end cap assemblies thereon before or after installing the LED light tube(s) in the sign assembly. That is, one may pre-position the direction of the LED light chips before installation by use of the rotatable end caps, or may install the tubes and then rotate them while the socket cap or exterior end of the rotatable end cap assembly is stationary in the socket 316 and the rotatable end cap is moved along with the hollow tube 102 and related features while installed within the frame 308. This capability allows for positioning the LED light tubes to provide desired direction for the sign assembly for a variety of lighting effects.

In a retrofit assembly 300A, two or more LED light tubes 100 may be installed. Two are shown for illustrative purposes in FIG. 12D. In such a configuration each of the light tubes, just one of the tubes or any number thereof may be rotated before or after installation for similar effects and optimal lighting, which is particularly useful in a two-side sign assembly having two translucent plates 306. For two-sided sign assemblies, it is desirable to rotate LED light tubes in opposing or differing directions to adequately light both sides of the sign assembly.

Once the light tubes are installed, the raceway cover (if any) may be replaced to protect the wiring and any back cover or second translucent plate re-installed to complete the sign. The power may then be turned back on for illuminating the sign assembly.

As noted above, the LED light tubes 100 herein may also be installed in a new sign assembly installation that is LED ready. With reference to FIGS. 12C and 12D, the resulting structure would be very much the same in the Figures as shown, but the ballast 320 would be omitted and the LED-ready installation sign assembly wiring would already be in place which omits the bypass as unnecessary. The sockets and connectors in the sign assembly may be formed initially to work with the LED light tubes herein or may be standard R17d ANSI lamp holders and sockets.

In the method for installing at least one LED light tube 100 as described herein having rotatable end caps on either end of the LED light tube, the method would include providing a sign assembly having at least one translucent plate, a frame structure securing a perimeter of the at least one translucent side plate. The frame may have an interior surface having at least two opposite sides spaced from each other, and at least two electrical sockets, each for receiving connectors on ends of the at least one LED light tube. Each of these features is shown in FIG. 12C with the understanding that sockets 316 need not be standard fluorescent sockets but sockets that are formed particularly for LED light tubes. Further, wiring provided need not be a bypass as was described for the retrofit method but can be wiring for connecting the sockets to an electrical source 322 may already configured for LED light tubes and without the presence of ballast 320.

In the new installation method, at least one LED light tube having a first and second end and having rotatable end cap assemblies positioned on each of the first and the second end of the at least one LED light tube are preferably provided, wherein the rotatable end cap assembly(ies) each have a connector extending from an end thereof. Preferably, each of the LED light tubes provided are configured in accordance with LED light tubes 100 as described herein.

The sign assembly is opened (either through removal of a back panel or a second translucent plate in a two-side sign assembly) so as to access the electrical sockets of the sign assembly as shown in FIG. 12C, but with the differences noted above.

The rotatable end cap assemblies on the first and the second ends of the at least one LED light tube are rotated. This may be done before or after installation. The at least one LED light tubes are installed such that the connectors on the ends of the rotatable end cap assemblies of the LED light tubes are positioned in electrical communication with the electrical sockets of the sign assembly to form a LED light tube sign assembly. Each of the LED light tubes in the sign assembly or only one or a specific number thereof may be rotated to direct light in desired directions within the LED light tube sign assembly. In a two-sided sign assembly two or more LED light tubes may be rotated in opposite or different directions for optimal lighting and/or enhanced lighting effects. Once the LED light tube(s) are installed in the sign assembly, the power may be turned back on and the cover or other translucent plate in the case of a two-sided light assembly by be reinstalled.

The wiring used may be 120 to 277 V AC and wired directly to the LED light tubes with the "hot" wires going to one end of the LED light tube (see FIG. 12B, but without the bypass wherein the "hot" wires are on the right side with the ballast omitted) and common wiring is connected to the other end of the LED light tube (on the left side of sign assembly 300 but without the bypass). No external ballast or other power supply is needed.

The present invention thus allows for installation without the need to transform or modify existing physical components either in an LED-ready new installation or when retrofitting existing sign installations that may be configured for standard fluorescent light use. In retrofitting, all of the existing sockets and wiring are re-used. All that need be done is the bypass wiring as described above such that wire line voltage goes directly to the sockets all within the existing sign assembly compartment.

It should be understood to those skilled in the art based on this disclosure that parts may be modified provided they carry out the same functions or generally concepts expressed in the embodiment described herein without departing from the general scope of the invention. Colored or modified LEDs of a variety of wattage may be used as well as different outer housings, modified diffusers, varying internal electrical components for operation of the LED light tube, and varying conductive material and connectors, each of which may be incorporated within the scope of the invention.

The LED light tubes may be provided in a variety of sizes to accommodate existing and new installation sign assemblies. LED light tube lengths can be made to match those of existing fluorescent products that are being replaced including T12/T8HO lamps thereby further ensuring that no additional modifications to the sign assembly are needed to ensure a proper fit.

The rotatable end cap LED light tubes herein may also be incorporated in different LED light tube end applications such as in office or interior lighting boxes, and other known LED light tube uses. The LED light tubes herein may also be used with various optical lenses placed over the LED chips to optimize light distribution for sign applications and other end applications of the rotatable LED light tubes. The invention herein further provides the ability to save energy through easy retrofitting over the life of the sign assembly or other structure into which the rotatable LED light tubes are installed. The installation methods provided herein, particularly in retrofitted situations is far more quickly completed than prior art LED tube retrofitting methods.

Due to the design of the rotatable end caps as described herein, installations do not need adaptors or other modification structures to accept or fit the LED light tubes of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A sign assembly, comprising:
   at least one translucent side plate;
   a frame structure securing a perimeter of the at least one translucent side plate, the frame having an interior surface and an exterior surface, wherein the interior surface of the frame has at least two opposite sides spaced from each other;
   at least one electrical socket;
   wiring for connecting the electrical socket to an electrical source; and
   at least one light emitting diode light tube, comprising
      a hollow tube defining a passageway extending longitudinally therethrough, the hollow tube having a first end and a second end and an exterior surface;
      a circuit board having a plurality of light emitting diode chips mounted thereon, the circuit board mounted on the exterior surface of the hollow tube; and
   a first and a second end cap assembly, each of the first and second end cap assemblies being mounted respectively on the first end and the second end of the hollow tube;
   wherein each of the first and the second end cap assemblies comprises
      a socket cap defining at least one hole extending longitudinally therethrough,
      a plug having a plug body and at least one connector extending longitudinally from an exterior end of the plug body, wherein the at least one connector is configured to pass through the at least one hole in the socket cap and be received within the at least one electrical socket, the plug body having on an interior end thereof, an interior surface defining an interior space therein,
      a rotatable end cap having an end cap body with a first end and a second end, the first end of the end cap body configured to engage one of the ends of the hollow tube and the second end of the end cap body having an inner surface defining a recess, at least one longitudinally extending bore extending through the rotatable end cap and through the recess of the second end of the end cap body, the bore defining a longitudinal passageway, and a longitudinally extending collar situated between the inner surface of the rotatable end cap and the longitudinally extending bore, wherein the plug body is configured to be received at least partially within the second end of the rotatable end cap,
      a cam locking mount having an exterior facing side configured to be positioned within the interior space of the plug body and an interior facing side having longitudinally extending projections configured to be received within the longitudinally extending bore of the rotatable end cap and to form a longitudinally extending opening between the projections in general alignment with the longitudinal passageway through the bore of the rotatable end cap,
      a rotation cam having a tubular shape defining a passageway extending therethrough, a first end and a second end, the first end positioned in the recess of the second end of the rotatable end cap between the collar and the bore of the rotatable end cap, wherein an inner facing surface of the collar is configured to receive and engage the first end of the rotation cam, the second end of the rotation cam configured to be received within the cam locking mount around the projections thereof,
      wherein the rotatable end cap is capable of controlled rotation with respect to the plug body and cam locking mount by rotation of the rotation cam within the collar, and
      wherein the connector of the plug is in electrical communication with the at least one circuit board.

2. The sign assembly according to claim 1, wherein there are two translucent side plates.

3. The sign assembly according to claim 1, wherein a design appears on the at least one translucent side plate.

4. The sign assembly according to claim 1, wherein the perimeter of the at least one translucent side plate is shaped as a rectangle or square.

5. The sign assembly according to claim 1, wherein the frame structure is formed of a metal or metal alloy.

6. The sign assembly according to claim 1, wherein the frame structure has a raceway at least at a bottom of the frame structure for receiving electrical wiring.

7. The sign assembly according to claim 1, wherein each of the at least one electrical socket is configured to receive a two prong connector.

8. The sign assembly according to claim 1, wherein at least a portion of the hollow tube comprises an aluminum extrusion.

9. The sign assembly according to claim 8, wherein each of the first ends of the end cap bodies defines an area configured to receive one of the first or second ends of the aluminum extrusion portion of the hollow tube, wherein aluminum extrusion portion fits securely within the respective area of the first ends of the end cap bodies.

10. The sign assembly according to claim 8, wherein the exterior surface of the aluminum extrusion portion of hollow tube comprises a pair of spaced apart flanges that each define at least one inwardly facing channel shaped to receive longitudinally extending opposite side edges of the circuit board.

11. The sign assembly according to claim 10, further comprising at least one longitudinally extending diffuser shaped to fit over the circuit board and the plurality of light emitting diodes, wherein the pair of spaced apart flanges each further defines an outwardly facing channel shaped to secure the diffuser to the exterior surface of the aluminum extrusion portion.

12. The sign assembly according to claim 10, comprising two circuit boards and the exterior surface of aluminum extrusion of the hollow tube comprises two pairs of the spaced apart flanges positioned on opposite sides of the hollow tube, wherein the inwardly facing channels of each pair of the spaced apart flanges are shaped to receive the longitudinally extending opposite sides of one of the circuit boards.

13. The sign assembly according to claim 12, further comprising two longitudinally extending diffusers, each shaped to fit over one of the circuit boards and the plurality of light emitting diodes, wherein each pair of spaced apart flanges each further defines an outwardly facing channel shaped to receive one of the diffusers.

14. The sign assembly according to claim 1, wherein each of light emitting diode chips has a lens situated over a top of one of the light emitting diode chips.

15. The sign assembly according to claim 14, wherein the lens has one or more mounting legs for spacing the lens above one of the light diode chips.

16. The sign assembly according to claim 1, wherein the socket cap has two holes.

17. The sign assembly according to claim 16, wherein the plug has two connectors.

18. The sign assembly according to claim 17, wherein the connectors are prong connectors.

19. The sign assembly according to claim 1, wherein the at least one connector is in electrical communication with the socket and also with a conductive material in electrical communication with the circuit board through wiring extending from the conductive material through the end cap assembly.

20. The sign assembly according to claim 19, further comprising at least one light emitting diode component positioned within the hollow tube in electrical communication with the plurality of light emitted diodes.

21. The sign assembly according to claim 19, wherein the wire extends through the longitudinally extending opening between the projections of the cam locking mount, through the passageway in the rotation cam and through the longitudinally extending passageway of the bore in the end cap body and through the first end of the end cap body.

22. The sign assembly according to claim 1, wherein the longitudinally extending bore of the end cap body extends beyond a perimeter edge of the second end of the end cap body.

23. The sign assembly according to claim 1, wherein the inner facing surface of the collar of the end cap body has a plurality of recesses shaped to successively receive an outward extending feature on a side edge of the first end of the rotation cam for controlled rotation.

24. The sign assembly according to claim 23, wherein the interior facing side of the cam locking mount has a surface extending at least partially peripherally around the longitudinally extending projections of the cam locking mount and at least one stop feature on the surface for engaging a recess proximate an edge of the inner surface of the second end of the end cap body of the rotatable end cap so as to limit rotation of the rotatable end cap.

25. The sign assembly according to claim 1, wherein the plug body is secured to the cam locking mount by at least one fastener.

26. The sign assembly according to claim 25, wherein the at least one fastener is a screw, and at least one of the plug body and the cam locking mount includes a screw receiving bore and the other has a through opening aligned with the bore.

27. The sign assembly according to claim 1, wherein the rotatable end cap includes at least one screw receiving bore and the hollow tube includes at least one inwardly fastener receiving extension for securing the rotatable end cap to the hollow tube by way of at least one fastener.

28. The sign assembly according to claim 27, wherein the at least one fastener is a screw.

29. A light emitting diode light tube comprising:
a hollow tube defining a passageway extending longitudinally therethrough, the hollow tube having a first end and a second end and an exterior surface;
a circuit board having a plurality of light emitting diode chips mounted thereon, the circuit board mounted on the exterior surface of the hollow tube; and
a first and a second end cap assembly, the first and second end cap assemblies being mounted respectively on the first end and the second end of the hollow tube; wherein each of the first and second end caps assemblies comprises
a socket cap defining at least one hole extending longitudinally therethrough,
a plug having a plug body and at least one connector extending longitudinally from an exterior end of the plug body, wherein the at least one connector is configured to pass through the at least one hole in the socket cap, the plug body having on an interior end thereof, an interior surface defining an interior space therein,
a rotatable end cap having an end cap body with a first end and a second end, the first end of the end cap body configured to engage one of the ends of the hollow tube and the second end of the end cap body having an inner surface defining a recess, at least one longitudinally extending bore extending through the rotatable end cap and through the recess of the second end of the end cap body, the bore defining a longitudinal passageway, and a longitudinally extending collar situated between the inner surface of the rotatable end cap and the longitudinally extending bore, wherein the plug body is configured to be received at least partially within the second end of the rotatable end cap,
a cam locking mount having an exterior facing side configured to be positioned within the interior space of the plug body and an interior facing side having longitudinally extending projections configured to be received within the longitudinally extending bore of the rotatable end cap and to form a longitudinally extending opening between the projections in general alignment with the longitudinal passageway through the bore of the rotatable end cap,
a rotation cam having a tubular shape defining a passageway extending therethrough, a first end and a second end, the first end positioned in the recess of the second end of the rotatable end cap between the collar and the bore of the rotatable end cap, wherein an inner facing surface of the collar is configured to receive and engage the first end of the rotation cam, the second end of the rotation cam configured to be received within the cam locking mount around the projections thereof,
wherein the rotatable end cap is capable of controlled rotation with respect to the plug body and cam locking mount by rotation of the rotation cam within the collar, and
wherein the connector of the plug is in electrical communication with the at least one circuit board.

30. The light emitting diode light tube according to claim 29, wherein a portion of the hollow tube comprises an aluminum extrusion.

31. The light emitting diode light tube according to claim 29, wherein each of the first ends of the end cap bodies defines an area configured to receive one of the first or second ends of the hollow tube, wherein each of the first and the second end of the hollow tube fits securely within the respective area of each of the first ends of the end cap bodies of each of the first and second rotatable end caps.

32. The light emitting diode light tube according to claim 29, wherein the exterior surface of the hollow tube comprises a pair of spaced apart flanges that each define at least one inwardly facing channel shaped to receive longitudinally extending opposite side edges of the circuit board.

33. The light emitting diode light tube according to claim 32, further comprising at least one longitudinally extending diffuser shaped to fit over the circuit board and the plurality of light emitting diodes, wherein the pair of spaced apart flanges each further defines an outwardly facing channel shaped to receive the diffuser.

34. The light emitting diode light tube according to claim 32, wherein the sign assembly comprises two circuit boards and the exterior surface of hollow tube comprises two pairs of the spaced apart flanges, wherein the inwardly facing channels of each pair of the spaced apart flanges are shaped to receive the longitudinally extending opposite sides of one of the circuit boards.

35. The light emitting diode light tube according to claim 34, further comprising two longitudinally extending diffusers, each shaped to fit over one of the circuit boards and the plurality of light emitting diodes, wherein each pair of spaced apart flanges each further defines an outwardly facing channel shaped to receive one of the diffusers.

36. The light emitting diode light tube according to claim 29, wherein each of light emitting diode chips has a lens situated over a top of one of the light emitting diode chips.

37. The light emitting diode light tube according to claim 36, wherein the lens has one or more mounting legs for spacing the lens above one of the light diode chips.

38. The light emitting diode light tube according to claim 29, wherein the socket cap has two holes.

39. The light emitting diode light tube according to claim 38, wherein the plug has two connectors.

40. The light emitting diode light tube according to claim 39, wherein the connectors are prong connectors.

41. The light emitting diode light tube according to claim 29, wherein the at least one connector is in electrical communication with a conductive material in electrical communication with the circuit board through wiring extending from the conductive material through the end cap assembly.

42. The light emitting diode light tube according to claim 41, further comprising at least one light emitting diode component situated within the hollow tube in electrical communication with the plurality of light emitted diodes.

43. The light emitting diode light tube according to claim 41, wherein the wire extends through the longitudinally extending opening between the projections of the cam locking mount, through the passageway in the rotation cam and through the longitudinally extending passageway of the bore in the end cap body and through the first end of the end cap body.

44. The light emitting diode light tube according to claim 29, wherein the longitudinally extending bore of the end cap body extends beyond a perimeter edge of the second end of the end cap body.

45. The light emitting diode light tube according to claim 29, wherein the inner facing surface of the collar of the end cap body has a plurality of recesses shaped to successively receive an outward extending feature on a side edge of the first end of the rotation cam for controlled rotation.

46. The light emitting diode light tube according to claim 45, wherein the interior facing side of the cam locking mount has a surface extending at least partially peripherally around the longitudinally extending projections of the cam locking mount and at least one stop feature on the surface for engaging a recess proximate an edge of the inner surface of the second end of the end cap body of the rotatable end cap so as to limit rotation of the rotatable end cap with respect to the respective end of the hollow tube.

47. The light emitting diode light tube according to claim 29, wherein the plug body is secured to the cam locking mount by at least one fastener.

48. The light emitting diode light tube according to claim 47, wherein the at least one fastener is a screw, and at least one of the plug body and the cam locking mount includes a screw receiving bore and the other has a through opening aligned with the bore.

49. The light emitting diode light tube according to claim 29, wherein the rotatable end cap includes at least one screw receiving bore and the hollow tube includes at least one inwardly fastener receiving extension for securing the rotatable end cap to the hollow tube by way of at least one fastener.

50. The light emitting diode light tube according to claim 49, wherein the at least one fastener is a screw.

51. A light emitting diode light tube comprising:
   a tube portion with an elongated longitudinal axis, and
   an end cap assembly at each end of the tube, the end cap assembly having electrical connectors projecting therefrom, the end cap assembly axially fixed to the ends of the tube, at least a portion of the end cap assembly being rotatable about the axis of the tube relative to the adjacent tube to direct light in a desired direction, the end cap assemblies comprise
      a socket cap defining at least one hole extending longitudinally therethrough for receipt of the electrical connectors,
      a plug having a plug body, wherein the electrical connectors extend connector extends longitudinally from an exterior end of the plug body, and the connector is electrical connectors are configured to pass through the at least one hole in the socket cap, the plug body having an interior end thereof, defining an interior surface defining having an interior space therein,
      a rotatable end cap having an end cap body with a first end and a second end, the first end of the end cap body configured to engage axially engaged with and fixed to one of the ends of the tube portion and the second end of the end cap body having an inner surface defining a recess,
      at least one longitudinally extending bore extending through the rotatable end cap and through the recess of the second end of the end cap body, the bore defining a longitudinal passageway through the end cap body, and
      a longitudinally extending collar situated between the inner surface of the rotatable second end of the end cap body and the longitudinally extending bore, the plug body configured to be received at least partially within the second end of the rotatable end cap body, a cam locking mount having an exterior facing side configured to be positioned within and axially fixed to the interior end of the plug body and an interior facing side having longitudinally extending projections configured to be received within the longitudinally extending bore of the rotatable end cap body, wherein the receipt of the projections within the end cap body axially fixes the cam locking mount and the plug body to end cap body and to form a longitudinally extending opening between the projections in general alignment with the longitudinal passageway through the bore of the rotatable end cap body, a rotation cam having a tubular shape defining a passageway extending therethrough, a first end and a second end, the first end positioned in the recess of the second end of the rotatable end cap body between the collar and the bore of the rotatable end cap body, wherein an inner facing surface of the collar is configured to rotationally receive and frictionally engage the first end of the rotation cam, the second end of the rotation cam configured to be received within the cam locking mount around the projections thereof and rotationally fixed thereto, wherein the rotatable end cap body is capable of controlled rotation with respect to the plug body and cam locking mount by rotation of the rotation cam within the collar.

52. A light emitting diode (LED) light tube comprising:
a tube portion defined by an elongated longitudinal axis and two opposite tube ends;
a series of individual LED's aligned in a spaced relationship along the tube portion, the series of LED's in electrical communication with each other and two tube ends;
an end cap assembly positioned at each of the tube ends, each end cap assembly having
    a first portion axially fastened to one of the ends of the tube, and
    a second portion axially fixed to the first portion while the second portion is rotatable relative to the first portion about the axis of the tube portion, the first and second portions having
        engaging portions for controlled rotation of the relative rotational movement of the first and second portions, and
        a stop feature to limit the amount of relative rotation of the first and second portions, and
        electrical connectors projecting outwardly from the second portion along the axis of the tube, the electrical connectors electrically connected to the series of LEDs through a central opening within the end cap assembly.

53. The light emitting diode (LED) light tube of claim 52 wherein the end cap assemblies further comprise:
an end cap body forming the first portion, the end cap body having a first end and a second end, the first end of the end cap body fixedly secured to one of the ends of a tube portion, the second end of the end cap body having an inner surface defining a recess, at least one longitudinally extending bore extending defining a longitudinal passageway through the end cap body,
a plug body forming the second portion, the electrical connectors extending longitudinally from an exterior end of the plug body, the plug body having on an interior end defining an interior surface having an interior space therein, a longitudinally extending collar situated between the inner surface of the second end of the end cap body and the longitudinally extending bore, the plug body configured to be received at least partially within the second end of the end cap body;

a locking cam mount, an exterior facing side of the cam mount positioned within and axially fixed to the interior end of the plug body, an interior facing side of the cam mount having longitudinally extending projections configured to be received within the longitudinally extending bore of the rotatable end cap, wherein the projections axially fix the cam mount and the plug body to end cap body, the projections form a longitudinally extending opening in general alignment with the longitudinal passageway through the bore of the end cap body, and a rotation cam having a tubular shape defining a passageway extending therethrough, a first end of the cam positioned in the recess of the second end of the end cap body between the collar and the bore, an inner facing surface of the collar rotationally received by and frictionally engaged with the first end, a second end of the cam received in the cam mount around the projections thereof and rotationally fixed thereto, wherein the engaging portions of the end cap body, the plug, the cam mount and the rotation cam cooperate for the controlled rotational movement of the first and second portions of the end cap assemblies about the tube axis.

54. The light emitting diode (LED) light tube of claim 52 wherein the end cap assemblies further comprise:
a rotation cam positioned between the first and second portions of the end cap assemblies, the rotation cam having surface features that are frictionally and incrementally engaged by corresponding surface features on the first portion, the engaging surface feature portions combining for the controlled rotation of the second portion about the tube axis.

55. The light emitting diode (LED) light tube of claim 52 wherein the stop feature of the end cap assemblies comprises a limit stop projecting from one portion of the end cap assembly and engaging within a recess formed on the opposite portion during the relative rotation of the two portions about the tube axis, the engagement of the stop in the recess limiting the rotation to less than 360 degrees.

56. The light emitting diode (LED) light tube of claim 52 wherein the electrical connectors project outwardly from the rotational portion of the end cap assembly along the axis of the tube, the electrical connectors electrically connected to a series of individual light emitting diodes aligned along the length of the tube portion through a central opening within the end cap assembly.

57. The light emitting diode (LED) light tube of claim 52 wherein the end cap assemblies comprise a first portion axially fastened to the end of the tube and a second portion axially fixed to the first portion while the second portion is rotatable relative to the first portion about the axis of the tube portion, the first and second portions having frictionally engaging portions for control of the relative rotation of the first and second portions.

58. The light emitting diode (LED) light tube of claim 52 wherein the end cap assemblies further comprise a rotation cam positioned between the first and second portions of the end cap assemblies, the rotation cam having surface features that are frictionally engaged by corresponding surface features on the first portion, the surface features combining for incremental controlled rotation of the second portion about the tube axis.

59. The light emitting diode (LED) light tube of claim 52 wherein the end cap assemblies further comprise a limit stop, the limit stop projecting from one portion of the end cap assembly and engaging within a recess formed on the opposite portion during the relative rotation of the two portions about the tube axis, the engagement of the stop in the recess limiting the rotation to less than 360 degrees.

* * * * *